(12) United States Patent
Toyota et al.

(10) Patent No.: US 7,252,319 B2
(45) Date of Patent: Aug. 7, 2007

(54) SEAT DEVICE FOR VEHICLE

(75) Inventors: Minoru Toyota, Hiroshima (JP); Akira Ito, Hiroshima (JP); Kazue Sumida, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 1 day.

(21) Appl. No.: 11/097,190

(22) Filed: Apr. 4, 2005

(65) Prior Publication Data

US 2005/0230996 A1  Oct. 20, 2005

(30) Foreign Application Priority Data

Apr. 15, 2004 (JP) .............................. 2004-120284

(51) Int. Cl.
*B60N 2/02* (2006.01)

(52) U.S. Cl. .............................. 296/65.09; 296/65.11; 297/235

(58) Field of Classification Search ............. 296/65.09, 296/65.11; 297/235, 257
See application file for complete search history.

(56) References Cited

U.S. PATENT DOCUMENTS

| | | | | |
|---|---|---|---|---|
| 2,839,312 | A * | 6/1958 | Barenyi et al. ............. | 280/775 |
| 4,341,415 | A * | 7/1982 | Braun et al. .................. | 296/64 |
| 6,270,140 | B1 * | 8/2001 | Opfer et al. ............. | 296/65.03 |
| 6,457,765 | B1 * | 10/2002 | Bergquist et al. ............. | 296/64 |
| 6,648,393 | B1 * | 11/2003 | Milnar et al. ............ | 296/65.11 |
| 6,955,386 | B2 * | 10/2005 | Rhodes et al. ........... | 296/65.09 |
| 2004/0100114 | A1 * | 5/2004 | Rhodes et al. ........... | 296/65.09 |
| 2004/0100115 | A1 * | 5/2004 | Rhodes et al. ........... | 296/65.09 |

FOREIGN PATENT DOCUMENTS

| | | |
|---|---|---|
| DE | 20000479 U1 | 6/2001 |
| DE | 20017051 U1 | 2/2002 |
| EP | 0588693 A1 | 3/1994 |
| FR | 2735081 A1 | 12/1996 |
| FR | 2806044 A1 | 9/2001 |
| FR | 2811619 A1 | 1/2002 |
| GB | 2372438 A | 8/2002 |
| GB | 2388313 A | 11/2003 |
| JP | 63-179248 | 11/1988 |
| JP | 07-108864 | 4/1995 |
| JP | 2000-264109 | 9/2000 |
| WO | WO 2004/071801 A1 | 8/2004 |

OTHER PUBLICATIONS

European Search Report Dated Jun. 7, 2005 Application No. EP 05005602.

* cited by examiner

*Primary Examiner*—Dennis H. Pedder
(74) *Attorney, Agent, or Firm*—Nixon Peabody LLP; Donald R. Studebaker

(57) ABSTRACT

There is provided the seat device for a vehicle, which is disposed on the rear floor panel in the cabin equipped with the ingress and egress opening at the side, comprising the first seat being provided so as to be folded, the second seat being provided beside the first seat, and the second-seat moving mechanism (the seat slide rails) to move the second seat laterally to the space of the original existing location of the first seat before the first seat has been folded. Accordingly, there can be provided a storage space beside the seat to allow an easy loading (easy access) from the outside of the vehicle, thereby improving facilities of the vehicle.

8 Claims, 25 Drawing Sheets

SEAT DEVICE FOR VEHICLE

BACKGROUND OF THE INVENTION

The present invention relates to a seat device for a vehicle, such as a rear seat, which is disposed on a floor panel in a cabin equipped with an ingress and egress opening at a side.

Conventionally, various types of structures for such a seat device for a vehicle, which provides a seat arrangement of the rear seat disposed on the floor panel in the cabin equipped with the ingress and egress opening at the side, have been invented.

For example, Japanese Patent Laid-Open Publication No. 2000-264109 discloses a rear seat device for a vehicle, in which a center seat is disposed between a right seat and a left seat and these right and left seats are moved back to a position between a pair of wheel houses, by moving the center seat forward and then moving the right and left seats back obliquely in such a manner that the right and left seats approach to each other.

Japanese Utility Model Laid-Open Publication No. 63-179248 discloses a slide seat device, in which there is provided a folding seat comprising a seat cushion and a seat back between right and left seats. Herein, these right and left seats are moved back to the position between the wheel houses, by folding the seat back on the seat cushion of the folding seat, subsequently folding the folding seat toward the right seat or the left seat, and then moving the right and left seats back obliquely in such a manner that the right and left seats approach to each other.

Japanese Patent Laid-Open Publication No. 7-108864 discloses a seat device for a vehicle, in which on a vehicle rear floor is provided a pair of slide rails formed symmetrically in a substantially Z shape, when viewed from above, which respectively comprise front straight portions which extend longitudinally to provide a wider distance between right and left seats, rear straight portions which extend longitudinally to provide a narrower distance between the right and left seats, and slant portions to obliquely interconnect the front and rear straight portions. Herein, the right and left seats are configured so as to be moved along these slide rails, and these seats are moved back to the rear straight portions of the slide rails, whereby these right and left seats can be located between the wheel houses.

Herein, the above-described seat devices have an advantage that it can improve comfortable sitting of the rear passenger on the seat, by moving back the right and left seats to the position between the wheel houses. It has a problem, however, that it could not provide a storage space beside the seat to allow an easy loading (easy access) from the outside of the vehicle.

SUMMARY OF THE INVENTION

The present invention has been devised in view of the above-described problem, and an object of the invention to provide a seat device for a vehicle which can provide a storage space properly beside the seat to allow an easy loading (easy access) from the outside of the vehicle, thereby improving facilities of the vehicle.

According to the present invention, there is provided a seat device for a vehicle, which is disposed on a floor panel in a cabin equipped with an ingress and egress opening at a side, comprising a first seat being provided so as to be folded, a second seat being provided beside the first seat, and a second-seat moving mechanism to move the second seat laterally into a space at an original existing location of the first seat before the first seat has been folded. Herein, the first seat and the second seat may constitute a rear seat of the vehicle which comprises right and left split seats.

According to this structure, since the second seat can be moved laterally into the space at the original existing location of the first seat before the first seat has been folded, there can be provided the proper storage space beside the seat to allow the easy loading and easy access to this storage space from the outside of the vehicle through the ingress and egress opening formed at the side, thereby improving facilities of the vehicle.

According to a preferred embodiment, the first seat comprises a seat cushion and a seat back, the seat back is configured so as to be folded on the seat cushion, and there is provided a first-seat holding mechanism to hold the first seat with the seat cushion and the seat back folded on the seat cushion in a double-fold state where both the seat cushion and seat back are positioned in an upright position. According to this structure, since there can be provided the space where no seat exits by positioning the first seat in its double-fold state, the second seat can obtain the sufficient lateral movement, thereby enlarging the storage space properly.

According to another preferred embodiment, the holding mechanism holds the first seat in the double-fold state where the seat cushion and seat back folded on the seat cushion have been rotated forward together. According to this structure, the space for the second seat being moved into can be provided properly just behind the first seat.

According to another preferred embodiment, the first seat is configured so as to have a smaller width than the second seat. According to this structure, since the first seat having the smaller width is light compared with the second seat having the larger width, it is easy to operate. Also, since the second seat with the larger width is moved laterally for the use, the comfortable sitting of the passenger on it can be improved.

According to another preferred embodiment, the second seat comprises a seat cushion and a seat back, the seat back of the second seat is configured so as to be folded on the seat cushion of the second seat, and there is provided a second-seat holding mechanism to hold the second seat with the seat cushion and the seat back folded on the seat cushion in a double-fold state where both the seat cushion and seat back of the second seat are positioned in an upright position. According to this structure, since both the seats can be folded, a cargo space can be expanded as much as possible.

According to another preferred embodiment, when the second seat is moved laterally by the second-seat moving mechanism, a storage space is formed between the second seat and a side wall of the cabin. According to this structure, since there can be the storage space (loading space) between the second seat and the side wall of the cabin, the easy loading and easy access from the outside of the vehicle can be attained.

According to another preferred embodiment, there is provided a slide mechanism to move the second seat backward to a position between wheel houses which project inwardly respectively in the cabin. According to this structure, since the second seat can be moved backward to the position between wheel houses, the comfortable sitting of the passenger on it can be improved.

Other features, aspects, and advantages of the present invention will become apparent from the following description which refers to the accompanying drawings.

DETAILED DESCRIPTION OF THE INVENTION

Figure 1:
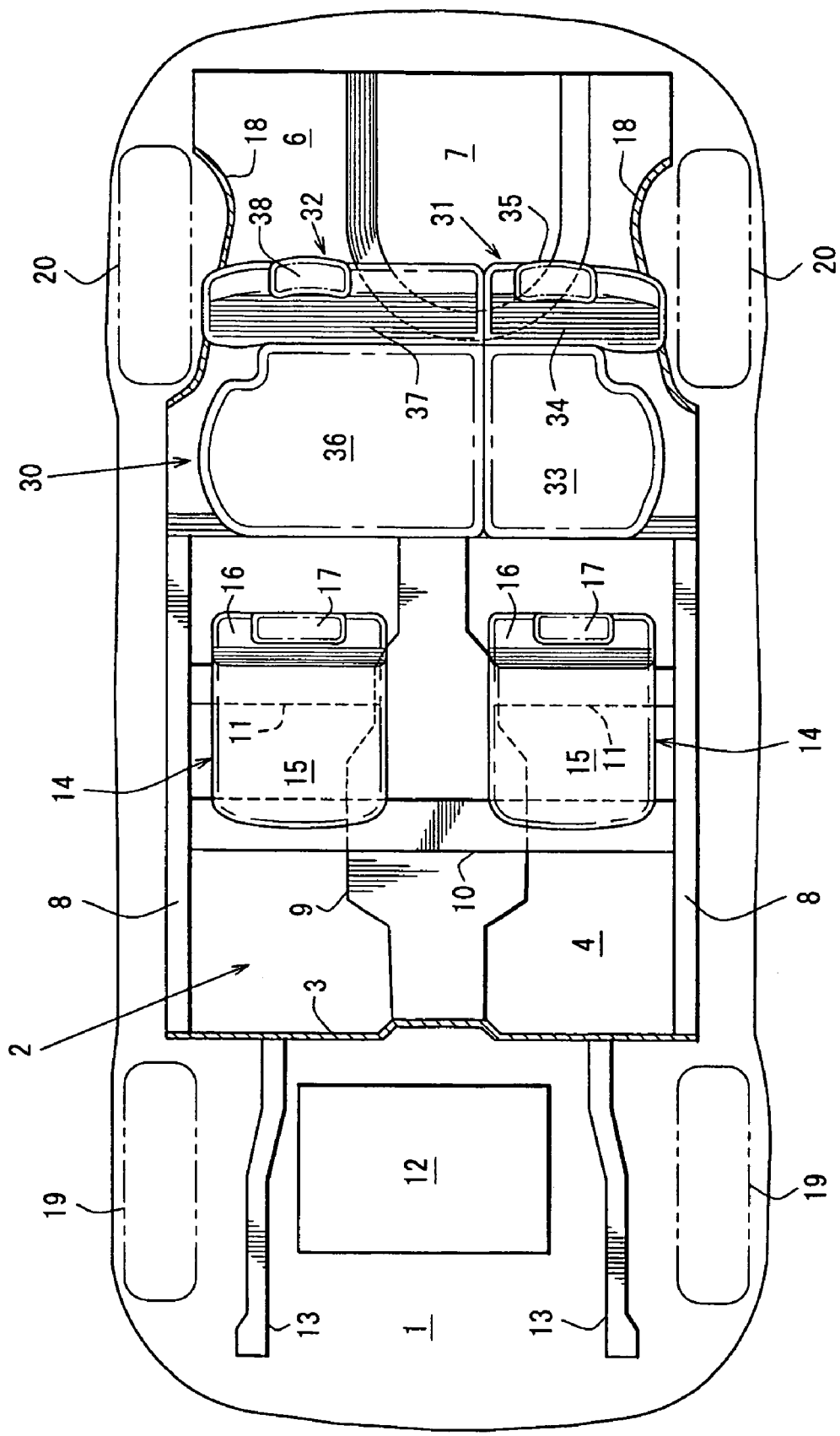
FIG. 1 is a plan view of a vehicle equipped with a seat device for a vehicle according to the present invention.
Figure 2:
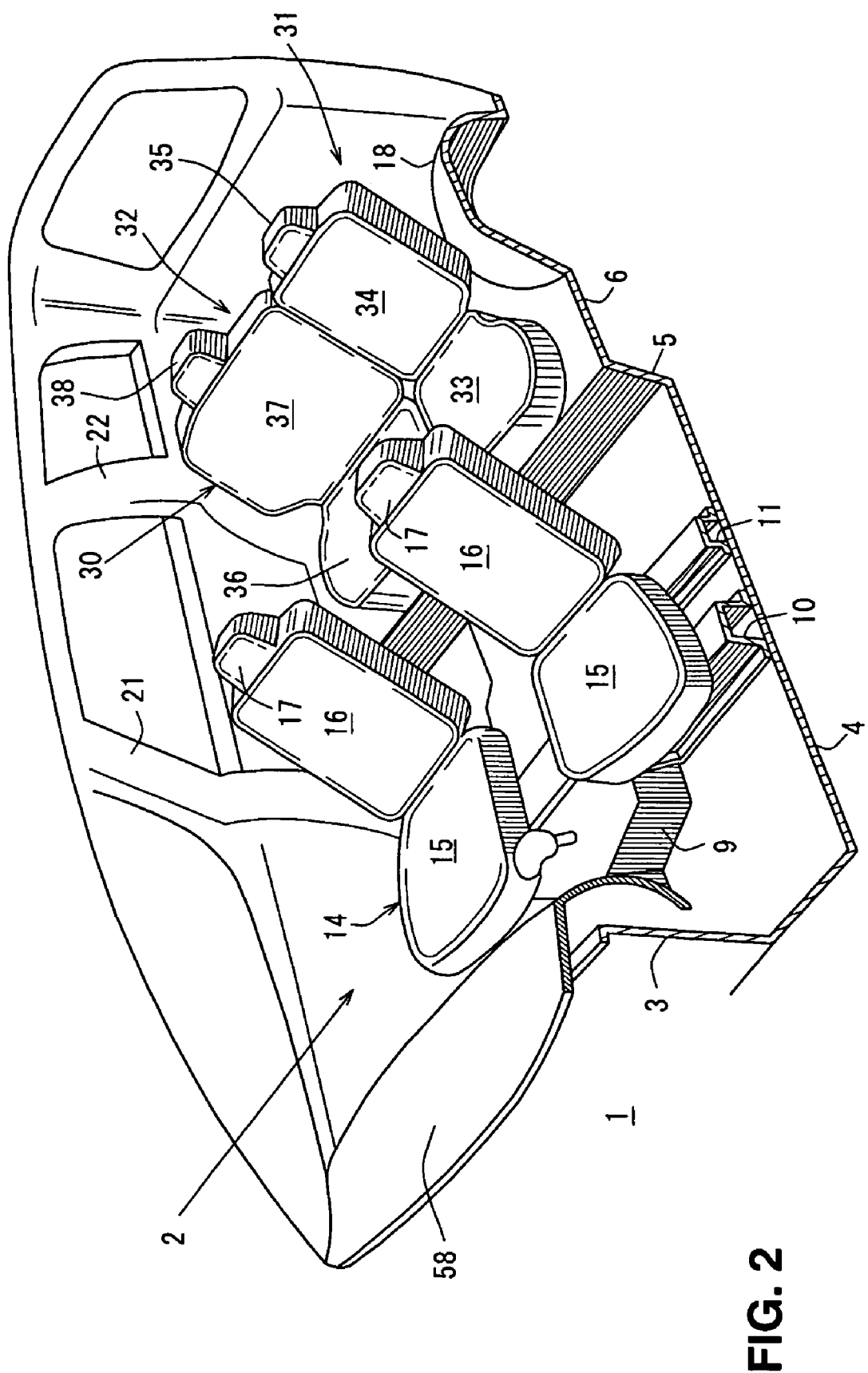
FIG. 2 is a perspective view of a major portion of FIG. 1.

Hereinafter, preferred embodiments of the present invention will be described referring to the accompanying drawings. It should be understood that even though embodiments are separately described, single features thereof may be combined to additional embodiments.

The drawings illustrate a seat device for a vehicle. First, a vehicle body structure will be described referring to FIG. 1. There is provided a dash lower panel (dash panel) 3 which separates a cabin 2 from an engine room 1 longitudinally. A floor panel 4 is connected to a lower end of the dash panel 3 so as to extend rearward substantially horizontally. A rear floor 6 is connected to a rear portion of the floor panel 4 via a kickup portion 5.

At a central portion of the rear floor 6 in a vehicle width direction is formed a spare tire pan 7. And, at both sides of the floor 4 are fixed side sills 8, 8, as vehicle-body rigidity members extending longitudinally. The side sill 8 comprises a side sill inner, a side sill reinforcement and a side sill outer, which form a side sill closed section.

Further, a tunnel portion 9, which projects toward the inside of the cabin 2 and extends longitudinally, is formed integrally with the central portion of the floor panel 4. The tunnel portion 9 is formed so as to extend longitudinally between the dash lower panel 3 and the kickup portion 5.

Also, there is provided a cross member 10 (so-called a NO. 2 cross member), as a vehicle-body rigidity member, which extends in the vehicle width direction to the both side sills 8, 8 beyond the above-described tunnel portion 9. Further, there is provided a pair of right-and-left cross members 11, 11 (so-called No. 2.5 cross members) in back of the cross member 10 which extends substantially perpendicularly to the tunnel portion 9 so as to interconnect the tunnel portion 9 and the side sill 8, respectively.

Meanwhile, a pair of front side frames 13, 13 (front frames) as vehicle-body rigidity members is provided at both sides in the engine room 1, in which an engine 12 is located, so as to extend longitudinally. At rear ends of the front side frames 13, 13 are continuously connected floor frames (not illustrated), as vehicle-body rigidity members, which are fixed at a lower face of the floor panel 4.

Herein, right-and-left front seats 14, 14 are attached on the respective cross members 10, 11. Each front seat 14 comprises a seat cushion 15, a seat back 16 and a headrest 17. One of the front seats 14, 14 is provided as a driver's seat and the other one 14 is provided as a passenger's seat.

Meanwhile, a rear seat 30 is attached on the rear floor 6 near the kickup portion 5 behind the front seats 14, 14.

In back of the rear seat 30 is formed a pair of right-and-left wheel houses 18, 18 which projects inwardly respectively in the cabin 2. Reference numerals 19, 19 denote front wheels of the vehicle and reference numerals 20, 20 denote rear wheels of the vehicle in FIG. 1.

Figure 3:
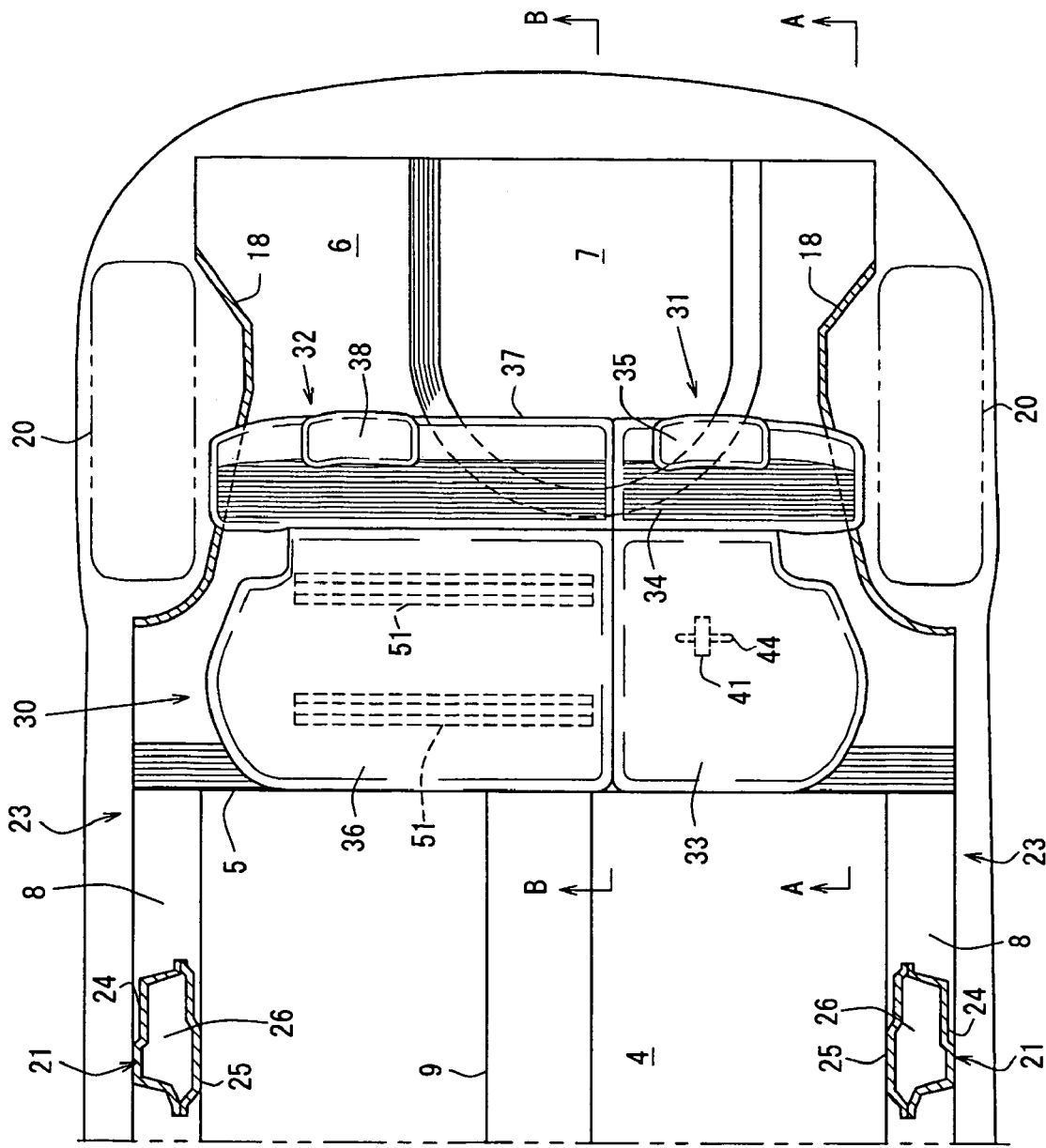
FIG. 3 is an enlarged plan view of the major portion of FIG. 1.

Next, the structure of the seat device for a vehicle will be described referring to FIGS. 2 through 6. As illustrated in FIG. 3, there is provided a center pillar 21 extending vertically between the side sill 8 and a roof side. And, an ingress and egress opening 23 for a rear passenger is formed in back of the center pillar 21, more specifically between the center pillar 21 and a quarter pillar 22 (see FIG. 2).

The center pillar 21 is a vehicle-body rigidity member, comprising a center pillar outer 24 and a center pillar inner 25, which form a pillar closed section 26 extending vertically.

The above-described rear seat 30 is provided on the rear floor 6 in the cabin 2 equipped with the ingress and egress opening 23 at the side, and the rear seat 30 comprises a left seat 31 (a first seat) and a right seat 32 (a second seat) which are split in the vehicle width direction.

The left seat 31 is configured so as to have a smaller width than the right seat 32 and comprise a seat cushion 33, a seat back 34 and a headrest 35.

Likewise, the right seat 32 is configured so as to have a larger width than the left seat 31 and comprise a seat cushion 36, a seat back 37 and a headrest 38.

Figure 4:
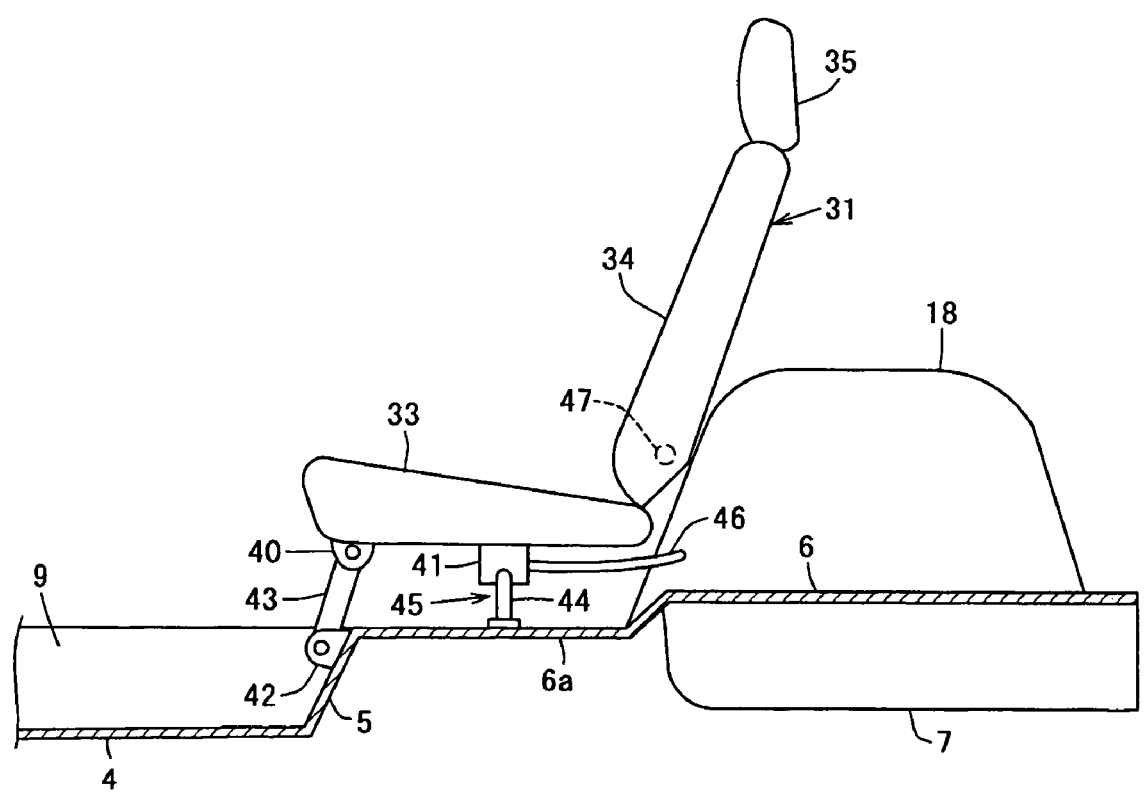
FIG. 4 is a view seen along line A-A of FIG. 3.
Figure 6:
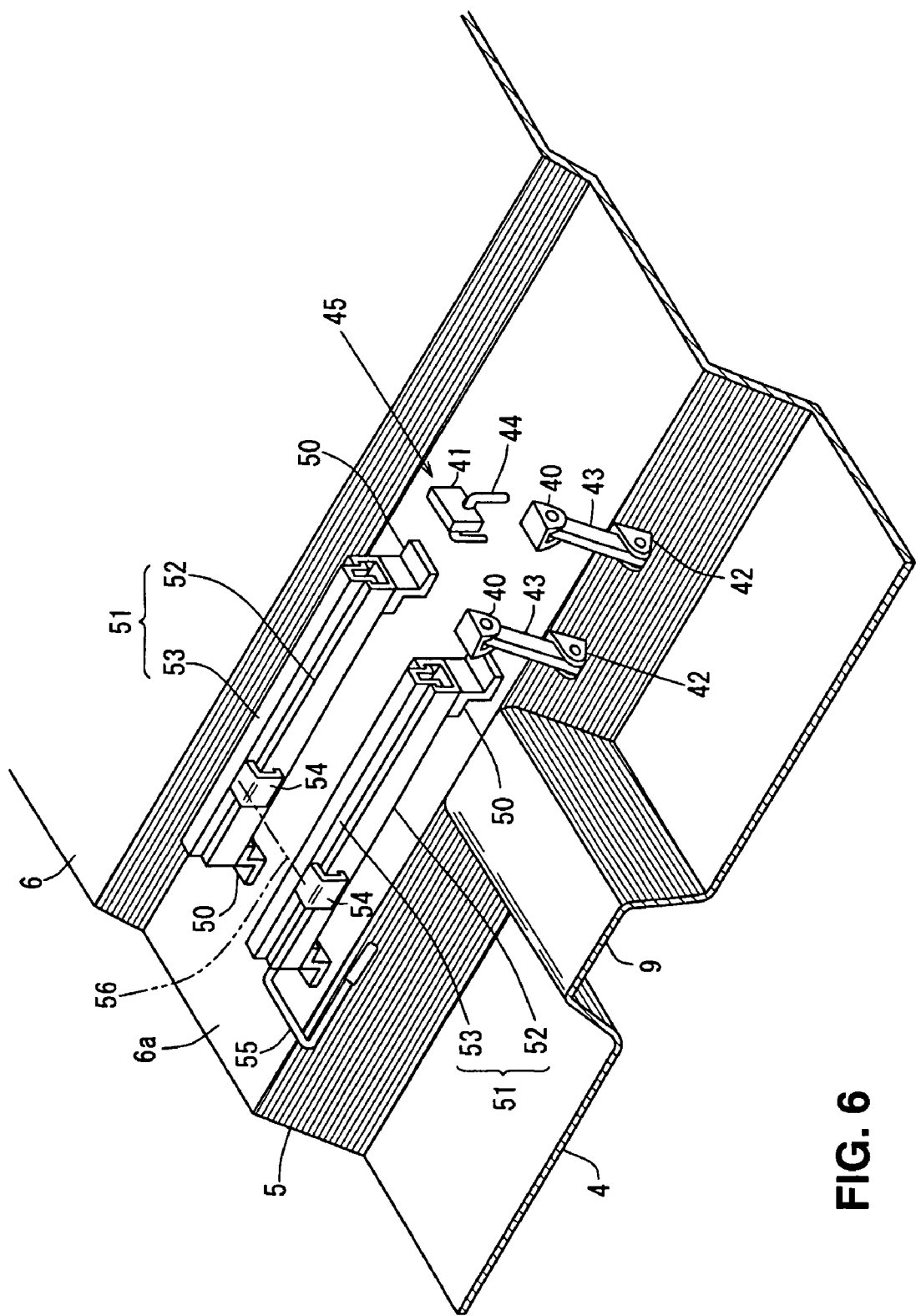
FIG. 6 is a perspective view illustrating a seat support structure.

As illustrated in FIGS. 4 and 6, a pair of right-and-left hinge brackets 40, 40 and a latch 41 are provided at a lower portion of the seat cushion 33 of the left seat 31. Further, at the kickup portion 5 are attached different hinge brackets 42, 42 so as to correspond to the above-described hinge brackets 40, 40. And, a pair of link members 43, 43 interconnects the respective hinge brackets 40 and 42. Further, a striker 44 is fixed to a difference-in-level portion 6a of the rear floor 6 so as to correspond to the above-described latch 41. The striker 44 and the latch 41 constitute a lock member 45. At the latch 41 is attached a release strap 46 (see FIG. 4) as a release member to disengage the latch 41 from the striker 44.

Herein, the seat back 34 of the left seat 31 is supported so as to rotate forward and rearward (reclining) around a reclining pivot 47 at a reclining knuckle with respect to the seat cushion 33.

The left seat 31 can be changed to its double-fold state through the following operational steps. Namely, first, the latch 41 is disengaged from the striker 44 by operating the release strap 46. Then, the seat back 34 is rotated forward around the reclining pivot 47 to be folded on the seat cushion 33. Next, the seat cushion 33, seat back 34 and headrest 34 are rotated forward together around the both pivots of the link members 43, 43 so as to be positioned in the upright position. Thus, the left seat 31 can be positioned in its double-fold state, without taking off the headrest 35, as illustrated in FIGS. 7, 8 and 9.

Namely, these hinge brackets 40, 40 and 42, 42 and link members 43, 43 constitute a first-seat holding mechanism to hold the left seat (the first seat) 31 in its forward-rotated double-fold state. Herein, the first-seat holding mechanism may be, of course, comprised of any members/parts which hold the seat in the double-hold sate instead of the above-described members.

Figure 7:
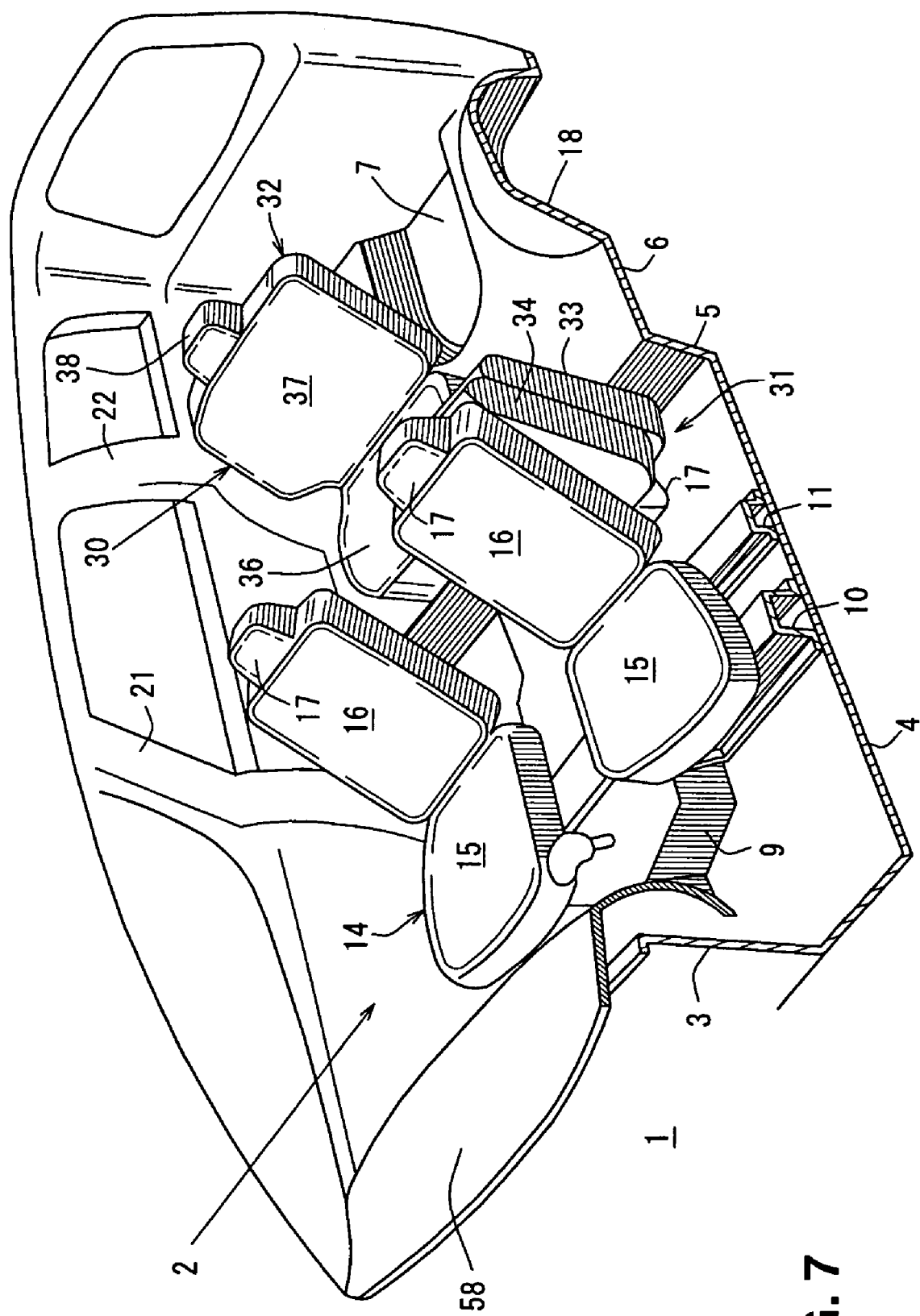
FIG. 7 is a perspective view illustrating a double-fold state of a first seat.
Figure 8:
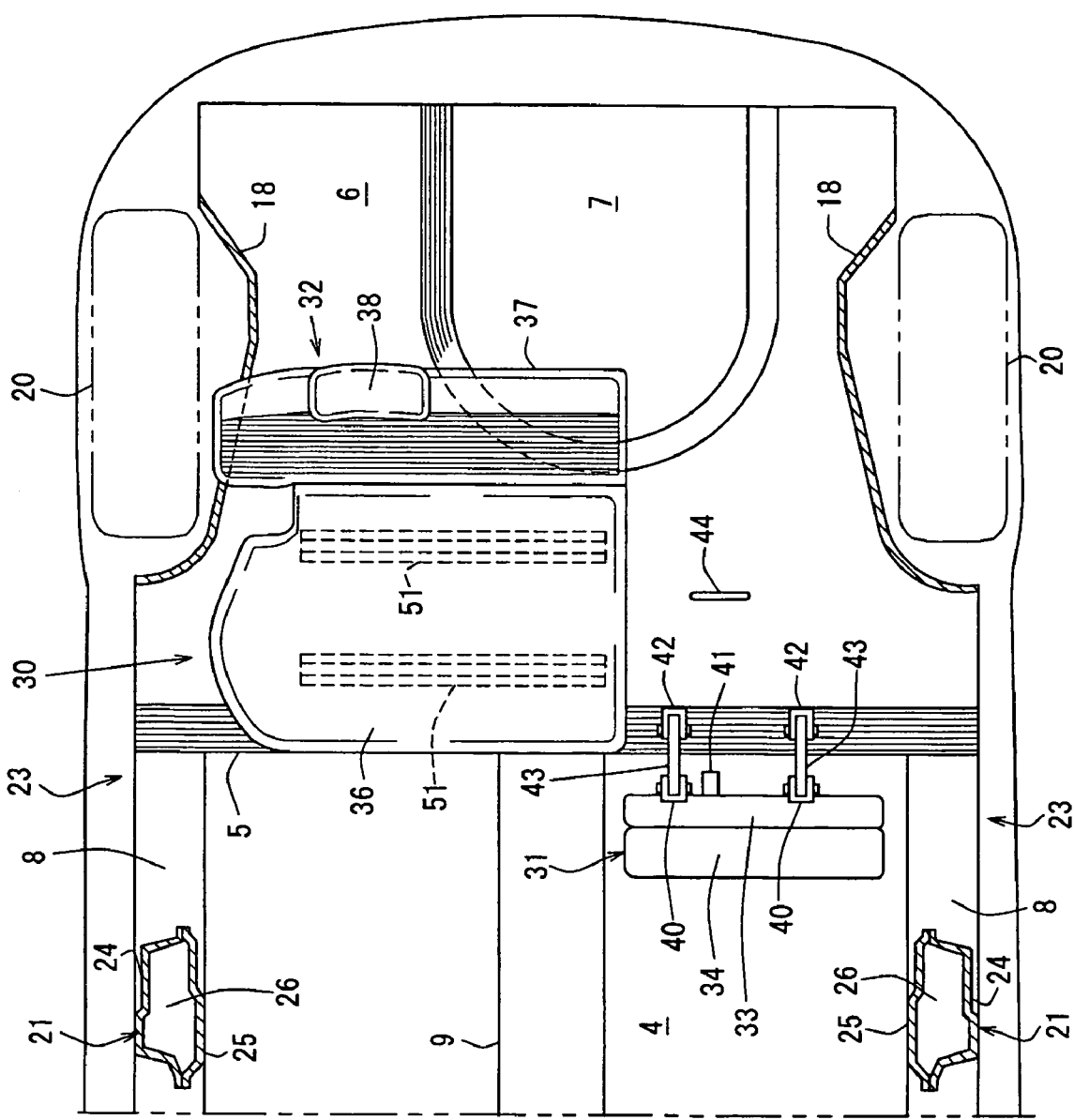
FIG. 8 is a plan view of a major portion of FIG. 7.
Figure 9:
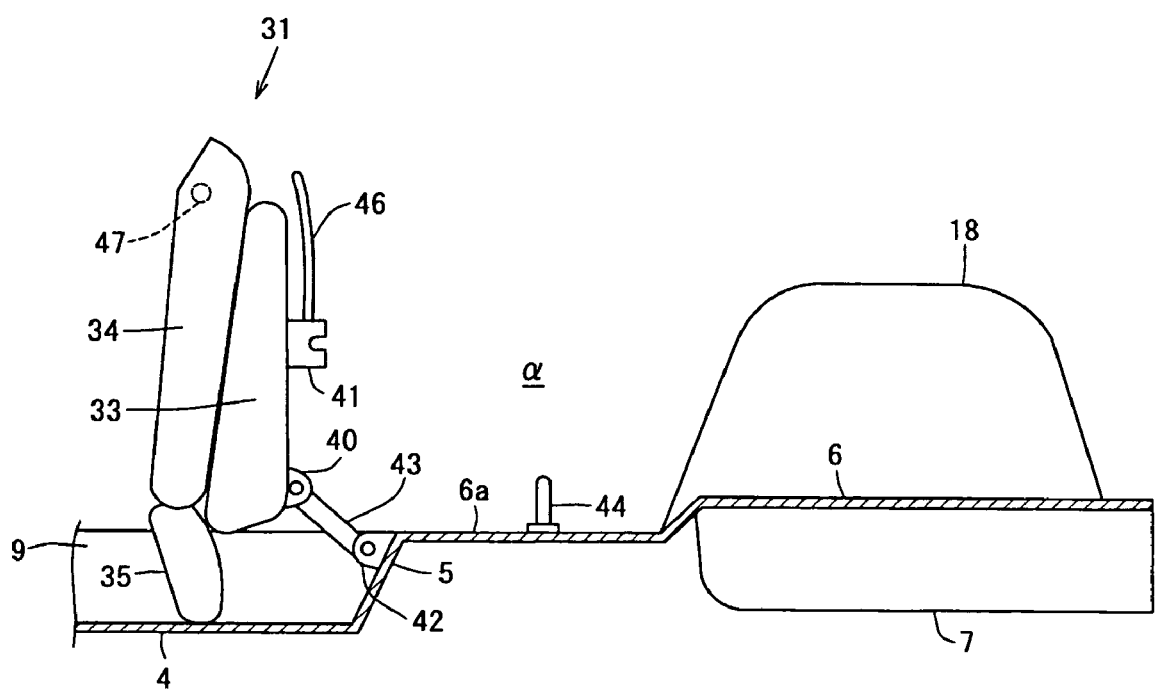
FIG. 9 is a side view of the major portion of FIG. 7.

The left seat 31 in the double-fold state illustrated in FIGS. 7 through 9 can provide a space α (see FIG. 9), in which no seat is located, at an original existing location of the left seat 31 before the left seat 31 has been folded.

The right seat 32 is configured so as to be moved laterally (in the vehicle width direction) into this space α for its use.

Figure 5:
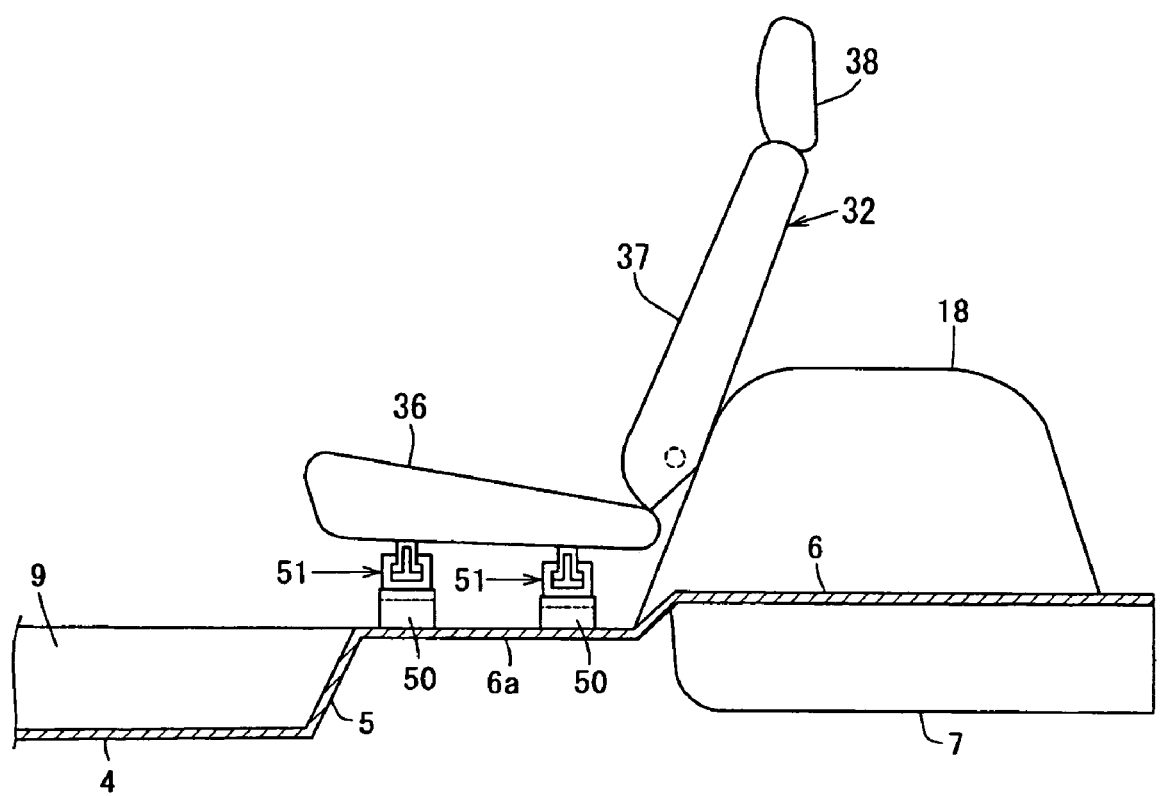
FIG. 5 is a view seen along line B-B of FIG. 3.

Namely, as illustrated in FIGS. 5 and 6, a pair of seat slide rails 51, 51 is attached at the difference-in-level portion 6a of the rear floor 6 which corresponds to the seat cushion 36 of the right seat 32. The seat slide rails 51, 51 are attached via plural brackets 50, 50 so as to extend laterally (in the vehicle width direction), respectively.

Each slide rail 51 comprises a fixed lower rail 52 and a movable upper rail 53 which slides on the lower rail 52 laterally. The seat cushion 36 is attached to the upper rails 53, 53 via a seat pan.

Further, there are provided lock members 54, 54 to lock and unlock the lower rail 52 and the upper rail 53 at the seat slide rails 51, 51, respectively. Respective lock members 54, 54 are interconnected by a release wire 56 so that the both lock members 54, 54 can be unlocked together by an operation of an operating lever 55.

Figure 10:
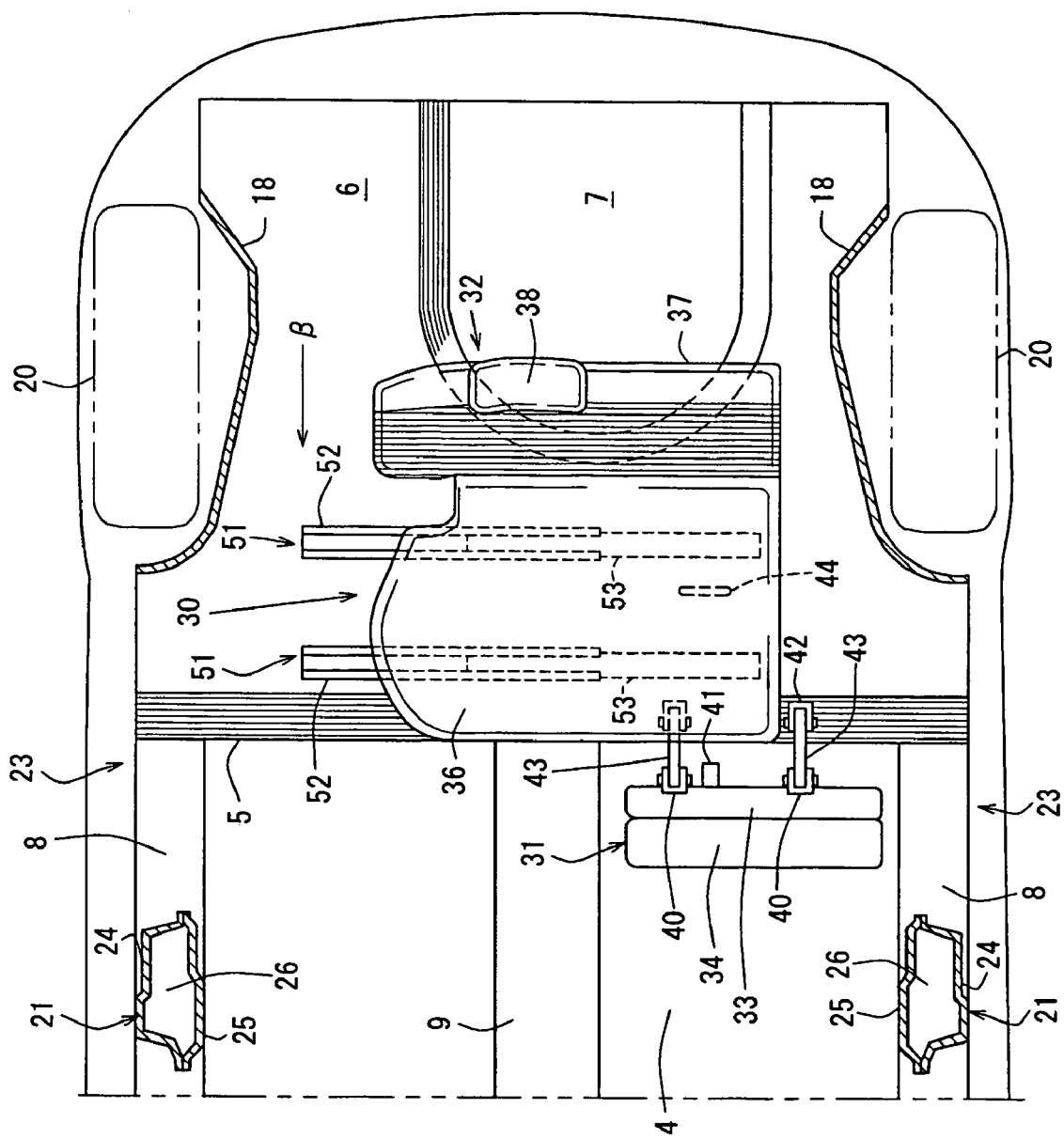
FIG. 10 is a plan view illustrating a lateral movement of a second seat.

Accordingly, after the left seat 31 has been folded and rotated forward to be positioned in the double-fold state as illustrated in FIGS. 7, 8 and 9, the right seat 32 is moved laterally toward the original existing location of the left seat 31 as illustrated in FIG. 10. Thereby, a storage space β can be formed properly between the right seat 32 and the side wall of the cabin 2.

Figure 11:
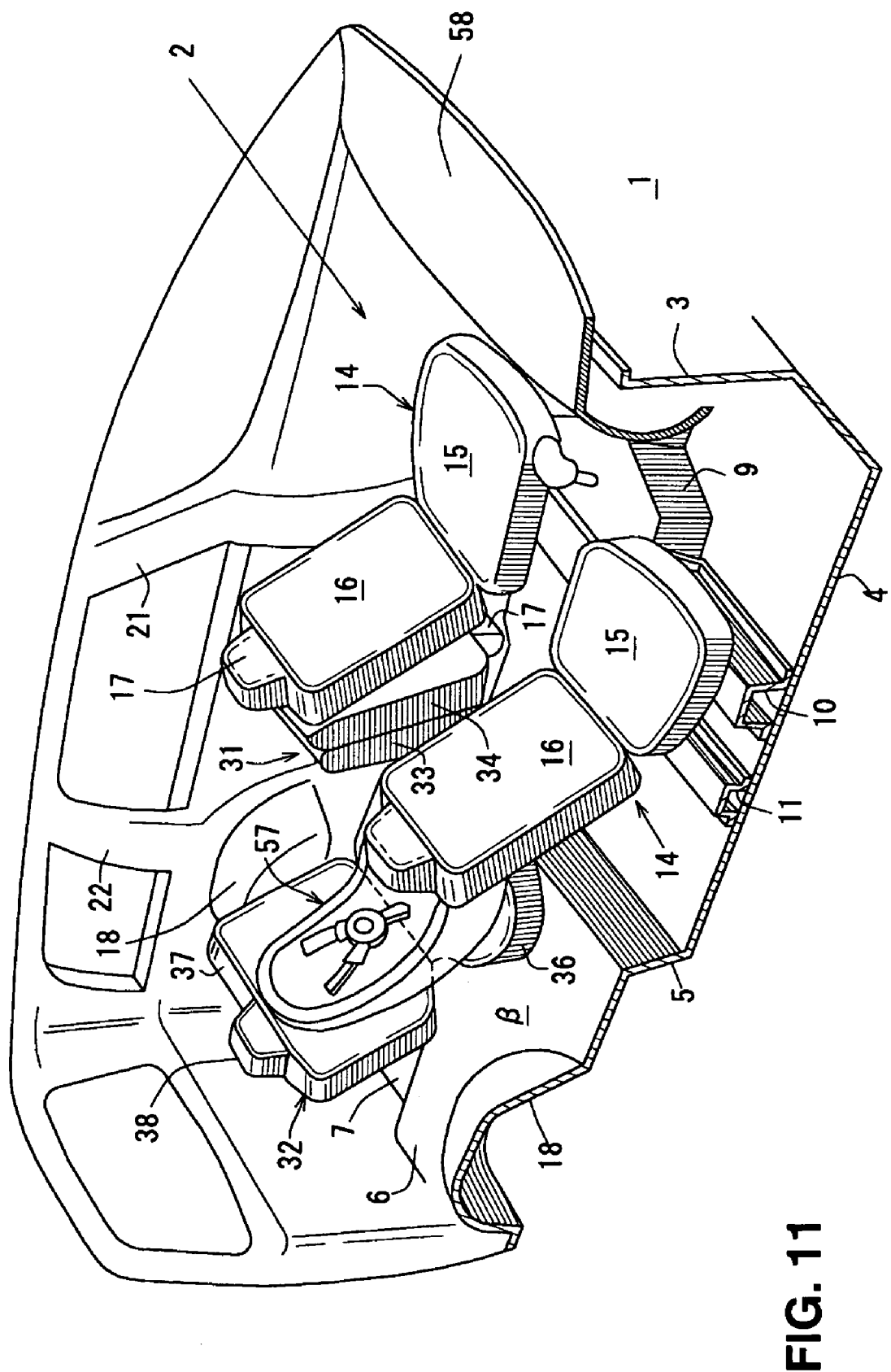
FIG. 11 is a perspective view illustrating an exemplified seat-use state.

Also, as illustrated in FIG. 11, a child seat 57 may be installed on the right seat 32. When the child seat 57 is located between the front seats 14, 14, i.e., in back of the center between the driver's seat 14 and the passenger's seat 14, it may be easy to have communication between passengers on the front seat 14 and the child seat 57. Any loads, such as a folding baby car, can be carried in the above-described storage space β. Reference numeral 58 denotes an instrument panel in the drawings.

As described above, according to the present embodiment illustrated in FIGS. 1 though 11, there is provided the seat device for a vehicle, which is disposed on the rear floor panel 6 in the cabin 2 equipped with the ingress and egress opening 23 at the side, comprising the first seat (see the left seat 31) being provided so as to be folded, the second seat (see the right seat 32) being provided beside the first seat, and the second-seat moving mechanism (see the seat slide rails 51, 51) to move the second seat laterally into the space a at the original existing location of the first seat before the first seat has been folded.

According to this structure, since the second seat (see the right seat 32) can be moved laterally into the space a at the original existing location of the first seat (see the left seat 31) before the first seat has been folded, as illustrated in FIG. 10, there can be provided the proper storage space (see the storage space β) beside the seat 32 to allow the easy loading and easy access to this storage space from the outside of the vehicle through the ingress and egress opening 23 at the side, thereby improving facilities of the vehicle.

Further, the first seat (see the left seat 31) comprises the seat cushion 33 and the seat back 34, the seat back 34 is configured so as to be folded on the seat cushion 33, and there is provided the first-seat holding mechanism (see the hinge brackets 40, 40 and 42, 42, and the link members 43, 43) to hold the first seat (see the left seat 31) with the seat cushion 33 and the seat back 34 folded on the seat cushion 33 in the double-fold state where both the seat cushion 33 and seat back 34 are positioned in the upright position as illustrated in FIGS. 7, 8 and 9. According to this structure, since there can be provided the space α (see FIG. 9) where no seat exits by positioning the first seat (see the left seat 31) in its double-fold state, the second seat (see the right seat 32) can obtain the sufficient lateral movement, thereby enlarging the storage space properly.

Herein, the holding mechanism (see the hinge brackets 40, 40 and 42, 42, and the link members 43, 43) holds the first seat (see the left seat 31) in the double-fold state where the seat cushion 33 and seat back 34 folded on the seat cushion 33 have been rotated forward together. According to this structure, the space α for the second seat (see the right seat 32) being moved into can be provided properly just behind the first seat (see the right seat 31).

Also, the first seat (see the right seat 31) is configured so as to have the smaller width than the second seat (see the right seat 32). According to this structure, since the first seat 31 having the smaller width is light compared with the second seat 32 having the larger width, it is easy to operate. Also, since the second seat 32 with the larger width is moved laterally for the use, the comfortable sitting of the passenger on it can be improved.

Further, when the second seat (see the right seat 32) is moved laterally by the second-seat moving mechanism, the storage space β (see FIGS. 10 and 11) is formed between the second seat (see the right seat 32) and the side wall of the cabin 2. According to this structure, since there can be the storage space β (loading space) between the second seat (see the right seat 32) and the side wall of the cabin 2, the easy loading and easy access from the outside of the vehicle can be attained.

FIGS. 12 through 24 illustrate another preferred embodiment. In this embodiment, the second seat (the right seat 32) is configured so as to be positioned in the double-fold state in addition to the first seat (the left seat 31). And, the second seat (the right seat 32) is moved backward to a position between wheel houses 18, 18.

Herein, the same portions (components) as those of the above-described embodiment are denoted by the same reference characters in FIGS. 12 through 24, whose detailed descriptions will be omitted. The striker 44 is located at a proper level so as not to interfere with the longitudinal movement of the seat slide rail 51.

FIGS. 12 through 15 illustrate a normal state of the seat device for a vehicle. In this embodiment, a pair of seat slide rails 60, 60 is provided at the both sides of the tunnel portion 9 so as to correspond to the seat cushion 36 of the right seat 32.

The seat slide rails 60, 60 are provided to guide the right seat 32 longitudinally, each of which comprises a lower rail 61 and an upper rail 62 sliding on the lower rail 61. And, respective lower rails 52, 52 of a pair of longitudinal 51, 51 (lateral slide rails) located above are fixed on the above-described upper rails 62, 62 seat slide rails 60, 60 (longitudinal slide rails) located below. These seat slide rails 51, 51 and 60, 60 are disposed in a square shape as illustrated, when viewed from above, thereby increasing the seat-support rigidity.

Figure 12:
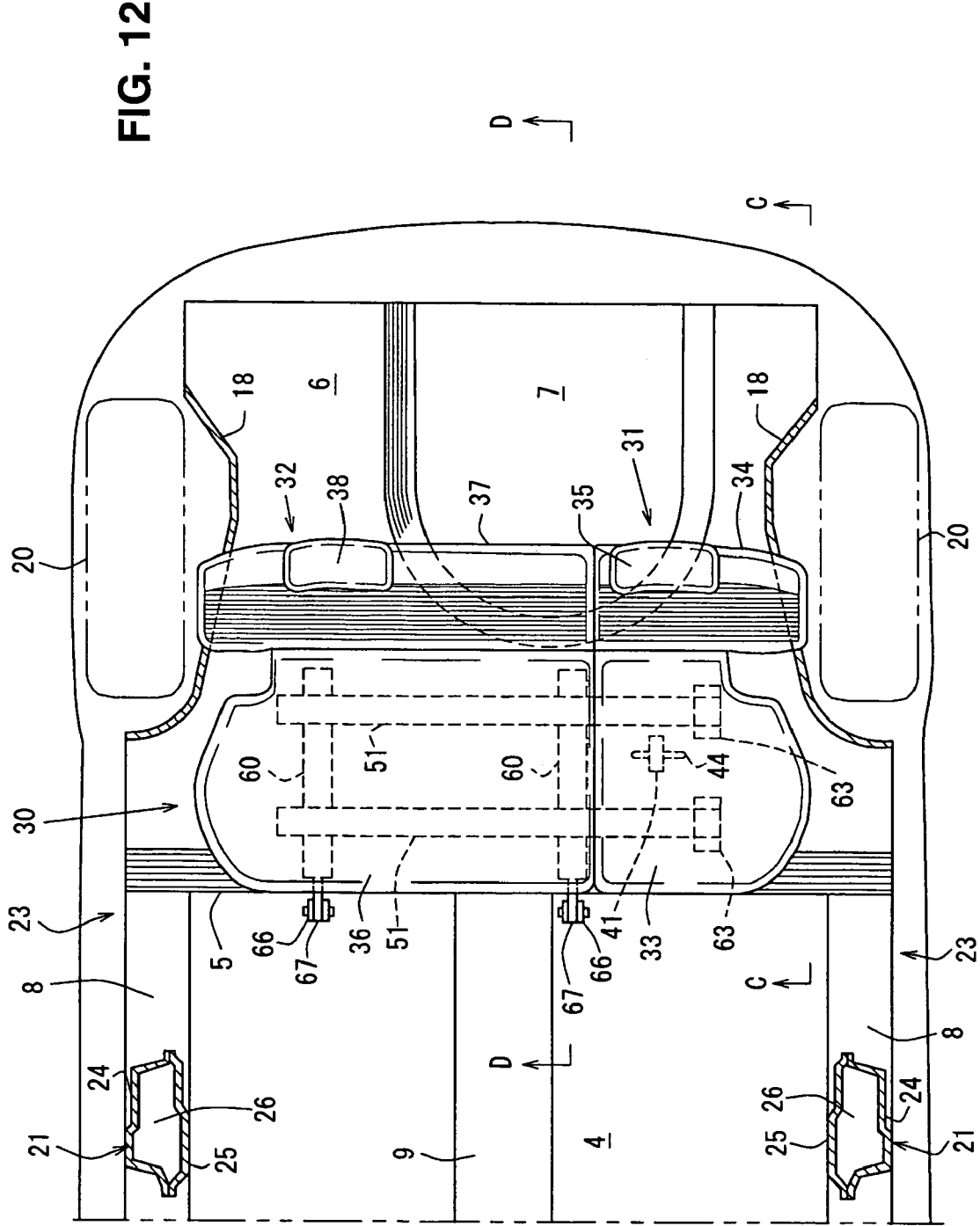
FIG. 12 is a plan view illustrating another embodiment of the seat device for a vehicle.
Figure 13:
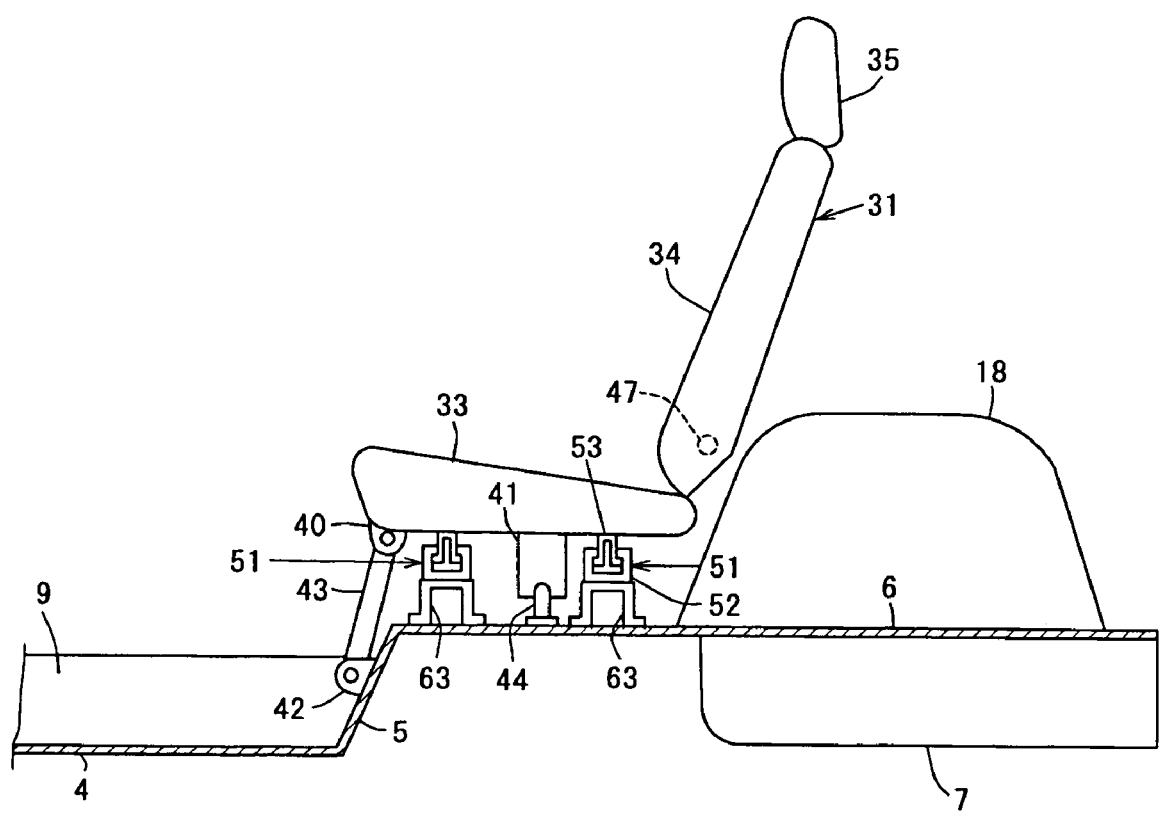
FIG. 13 is a view seen along line C-C of FIG. 12.

Also, left side ends of the lower rails 52, 52 of the upper seat slide rails 51, 51 extend below the seat cushion 33 of the left seat 31 as illustrated in FIGS. 12 and 13. These extended end portions are supported respectively by support brackets 63, 63, so that weights of the seats and passengers on the seats can be supported properly.

Figure 14:
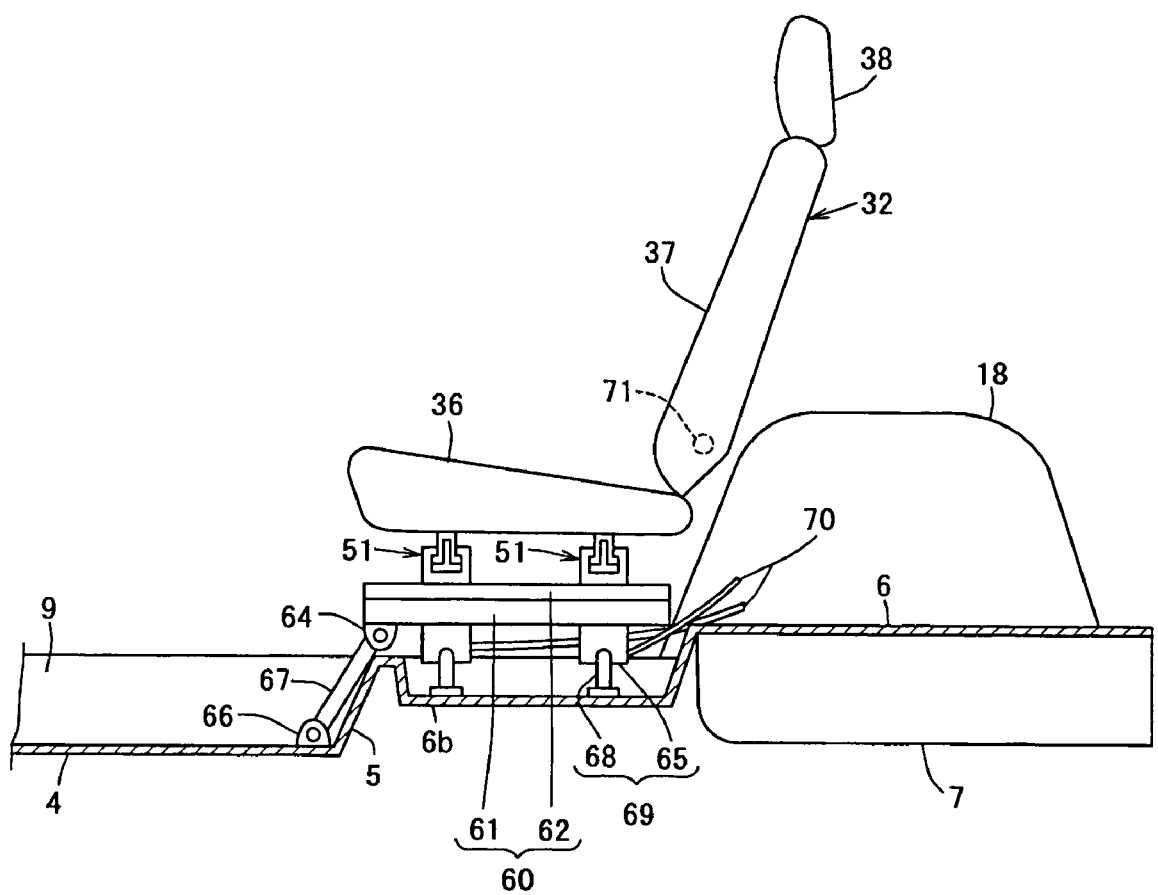
FIG. 14 is a view seen along line D-D of FIG. 12.
Figure 15:
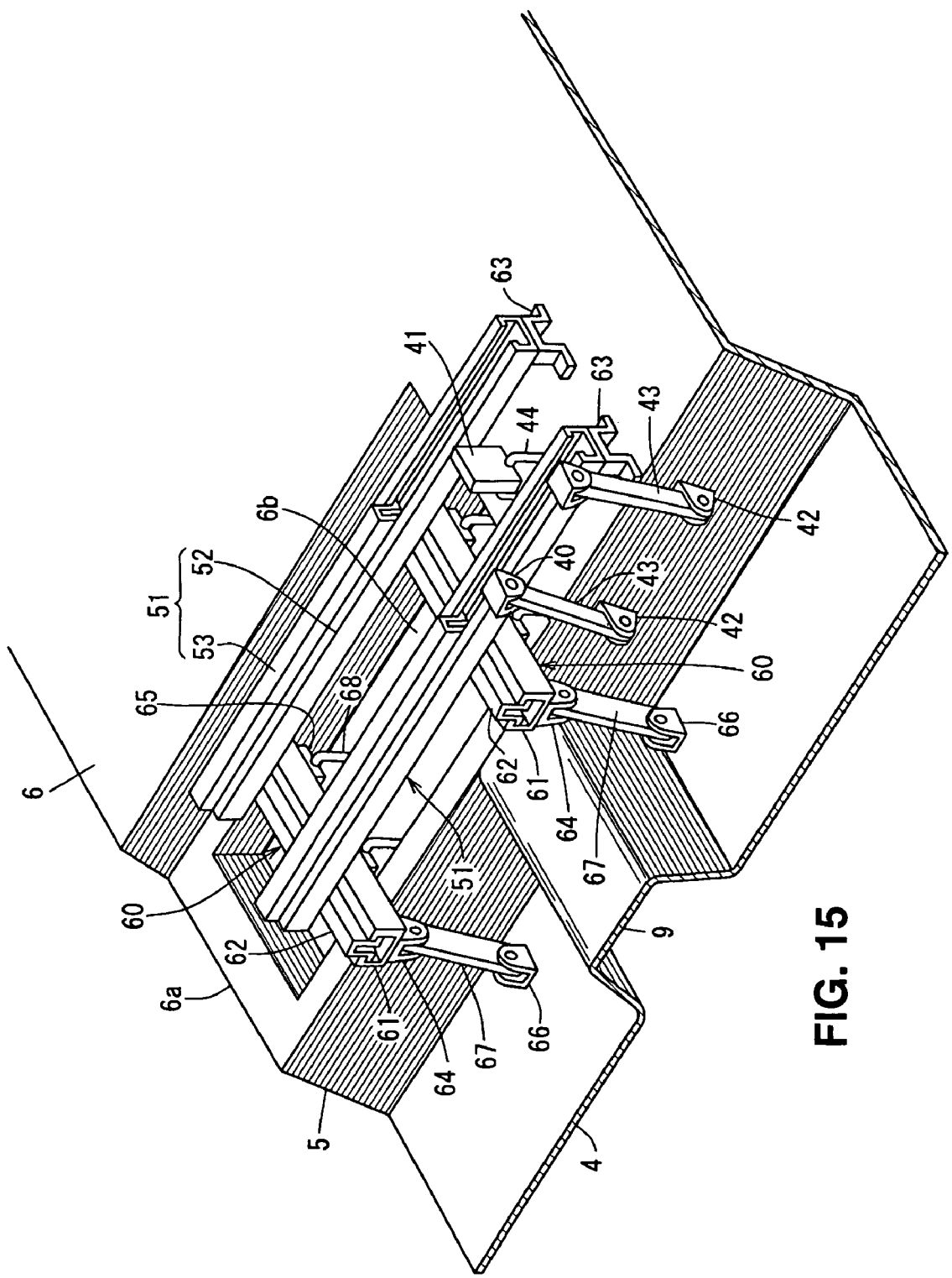
FIG. 15 is a perspective view illustrating a seat support structure.

As illustrated in FIGS. 14 and 15, at a lower portion of a front end of the lower rail 61 of each seat slide rail 60 are attached a hinge bracket 64 and two latches 65, 65. Meanwhile, on the floor panel 4 (or the kickup portion 5) are attached hinge brackets 66, 66 so as to correspond to the hinge brackets 64, 64. And, a pair of link members 67, 67 interconnects the upper hinge brackets 64, 64 and the lower hinge brackets 65, 65, respectively.

Also, strikers 68, 68 are fixed on a recess portion 6b of the rear floor 6 so as to correspond to the above-described latches 65, 65. The striker 68 and the latch 65 constitute a lock member 69 (see FIG. 14).

Further, to the latches 65, 65 are attached release straps 70, 70 (see FIG. 14) as a release member to disengage the latches 65, 65 from the strikers 68, 68, respectively. The seat cushion 36 of the right seat 32 is attached on the upper rails 53, 53 of the seat slide rails 51, 51 via a seat pan, and the seat back 37 thereof is supported so as to rotate forward and rearward (reclining) around a reclining pivot 71 at a reclining knuckle with respect to the seat cushion 36.

Figure 16:
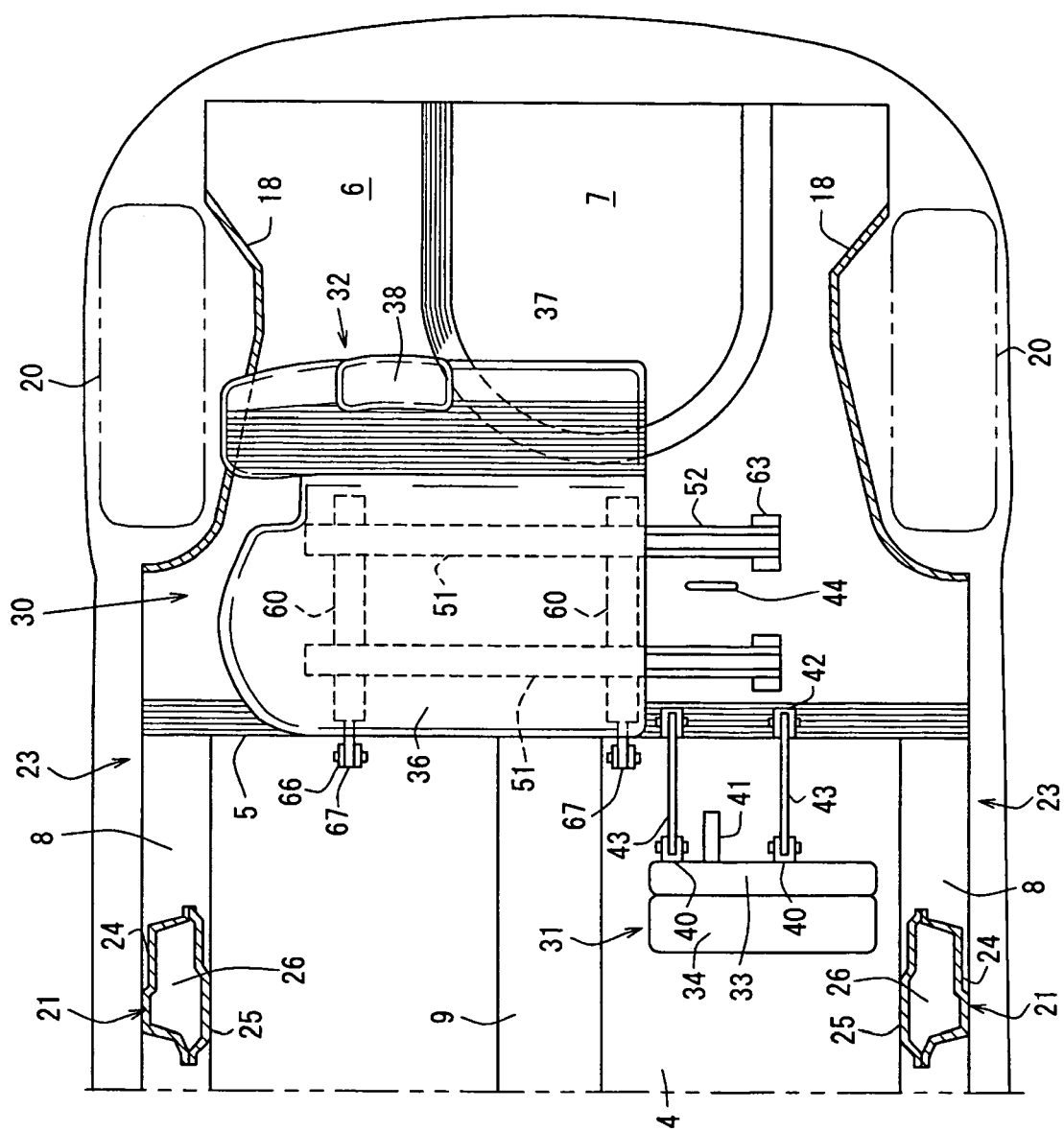
FIG. 16 is a plan view illustrating a double-fold state of a first seat.
Figure 17:
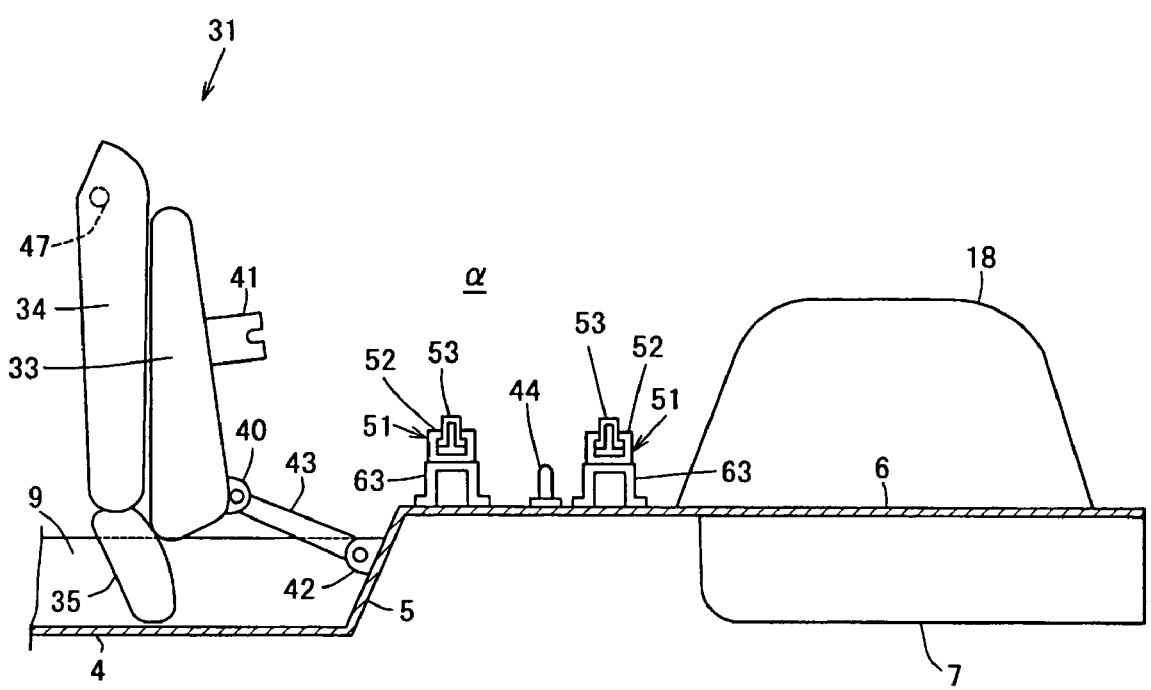
FIG. 17 is a side view of FIG. 16.

The left seat 31 can be changed from its normal state illustrated in FIGS. 12 through 15 to its double-fold state illustrated in FIGS. 16 and 17 through the following operational steps. Namely, first, the latch 41 is disengaged from the striker 44. Then, the seat back 34 is folded on the seat cushion 33. Next, the left seat 31 in the folded state is rotated forward as a whole around the both pivots of the link members 43, 43 so as to be positioned in the upright position. Thus, the left seat 31 can be positioned in its double-fold state, without taking off the headrest 35, as illustrated in FIGS. 16 and 17.

Figure 18:
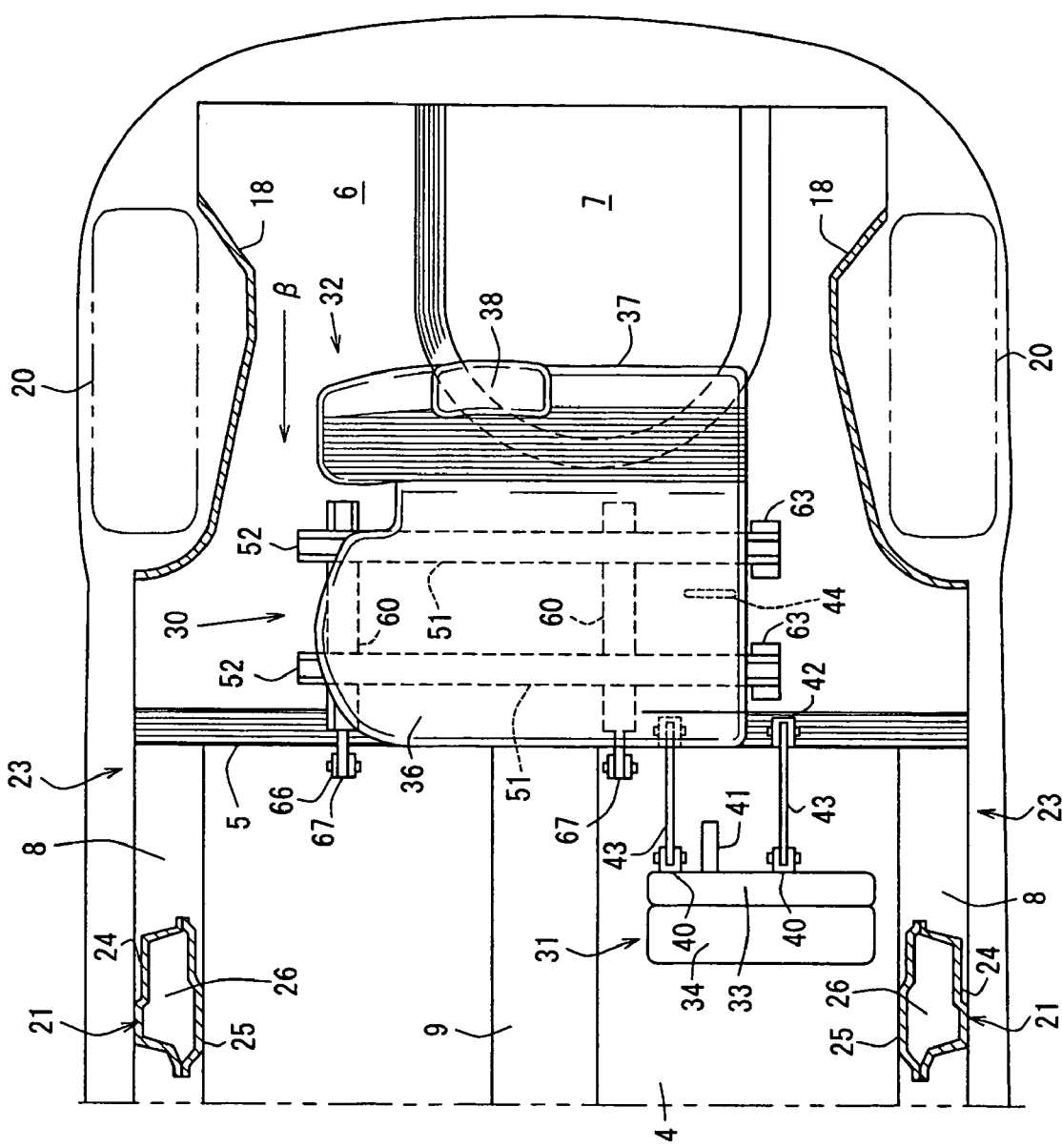
FIG. 18 is a plan view illustrating a lateral movement of a second seat.

Since the left seat 31 in the double-fold state provides a space α (see FIG. 17) in which no seat is located at an original existing location of the left seat 31, the right seat 32 can be moved laterally (in the vehicle width direction) for its use from its state illustrated in FIGS. 16 and 17 to its state located into this space α as illustrated in FIG. 18.

Figure 19:
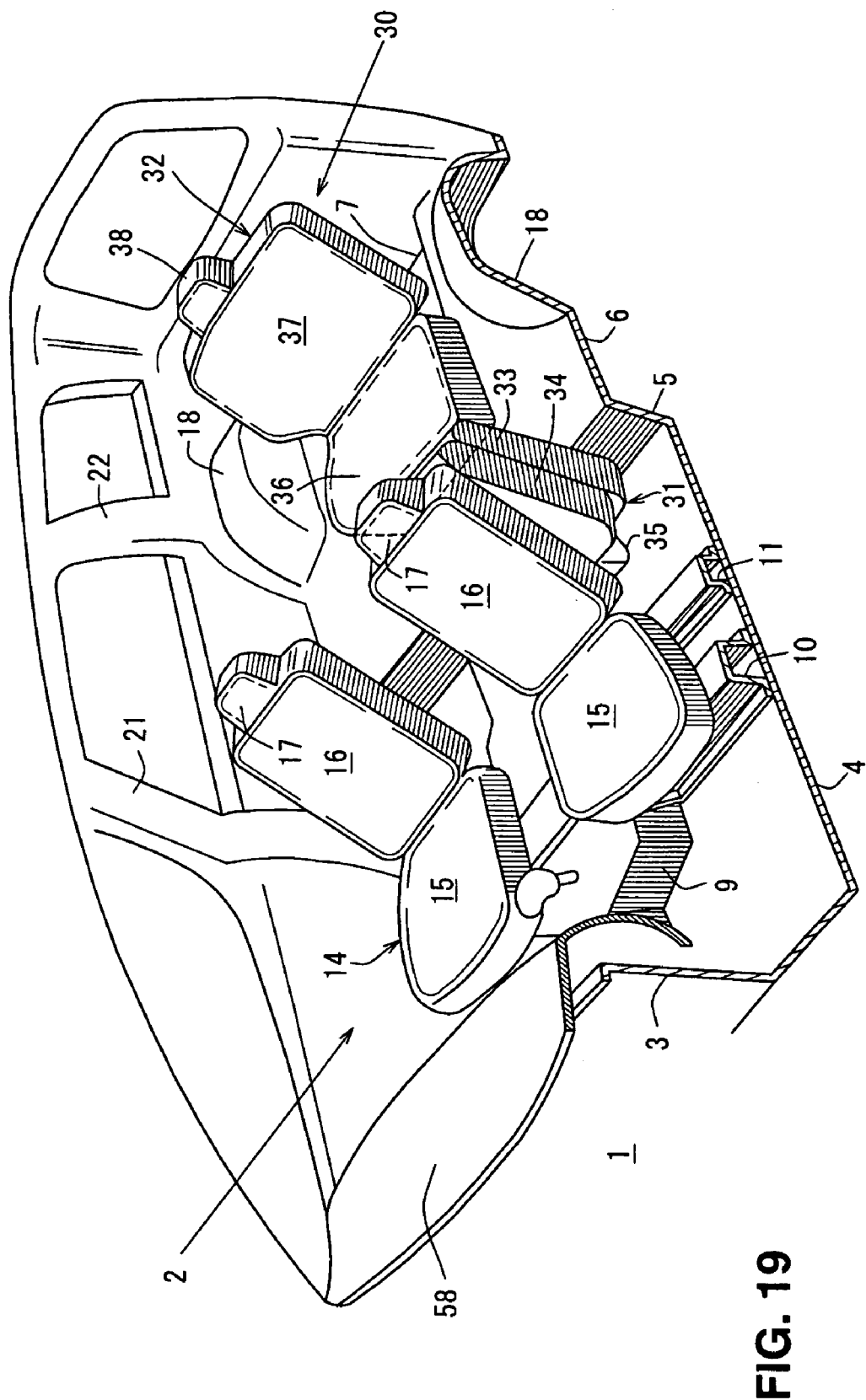
FIG. 19 is a perspective view of the seat having the lateral movement.
Figure 20:
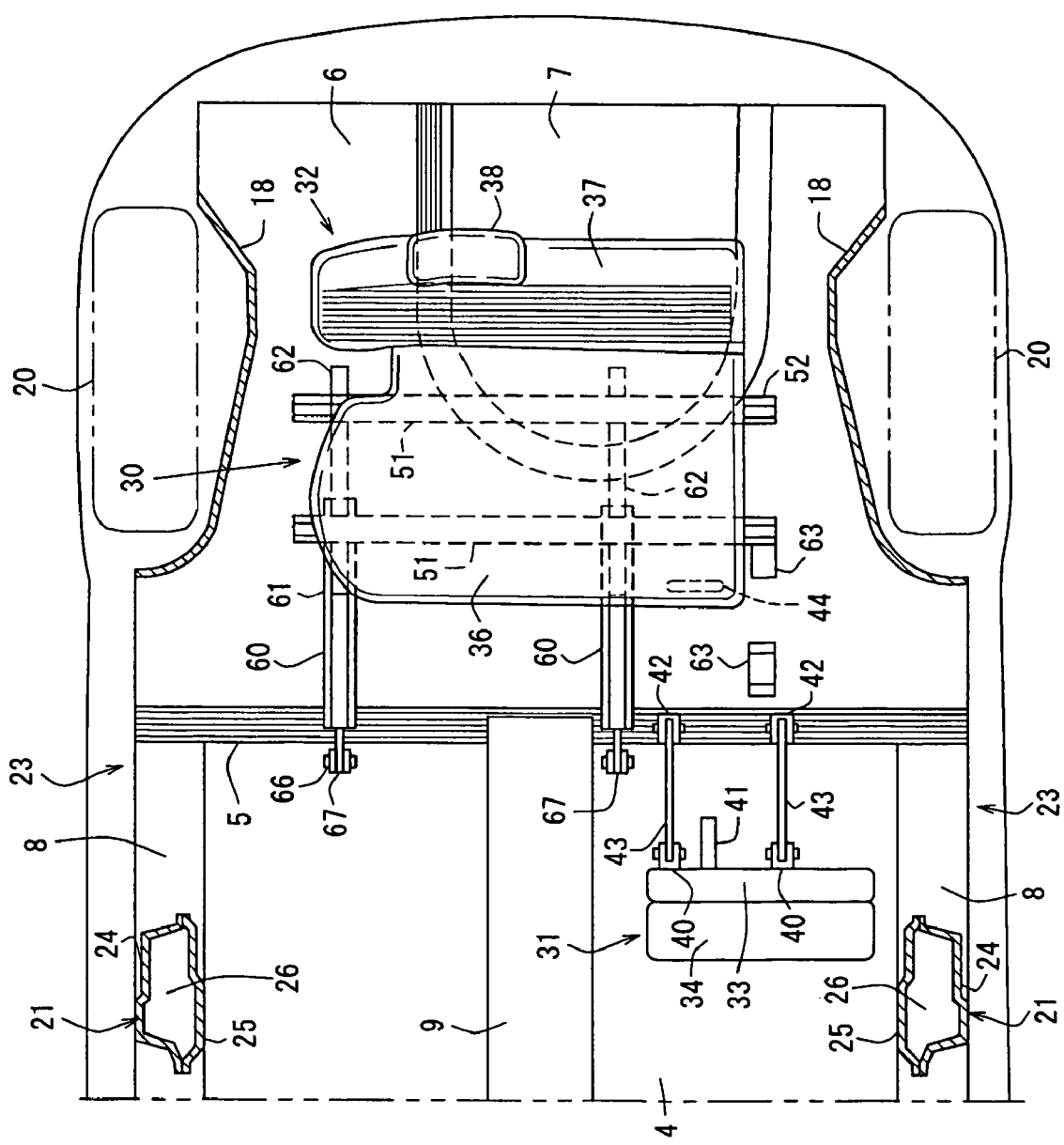
FIG. 20 is a plan view illustrating the second seat which is located between wheel houses.
Figure 21:
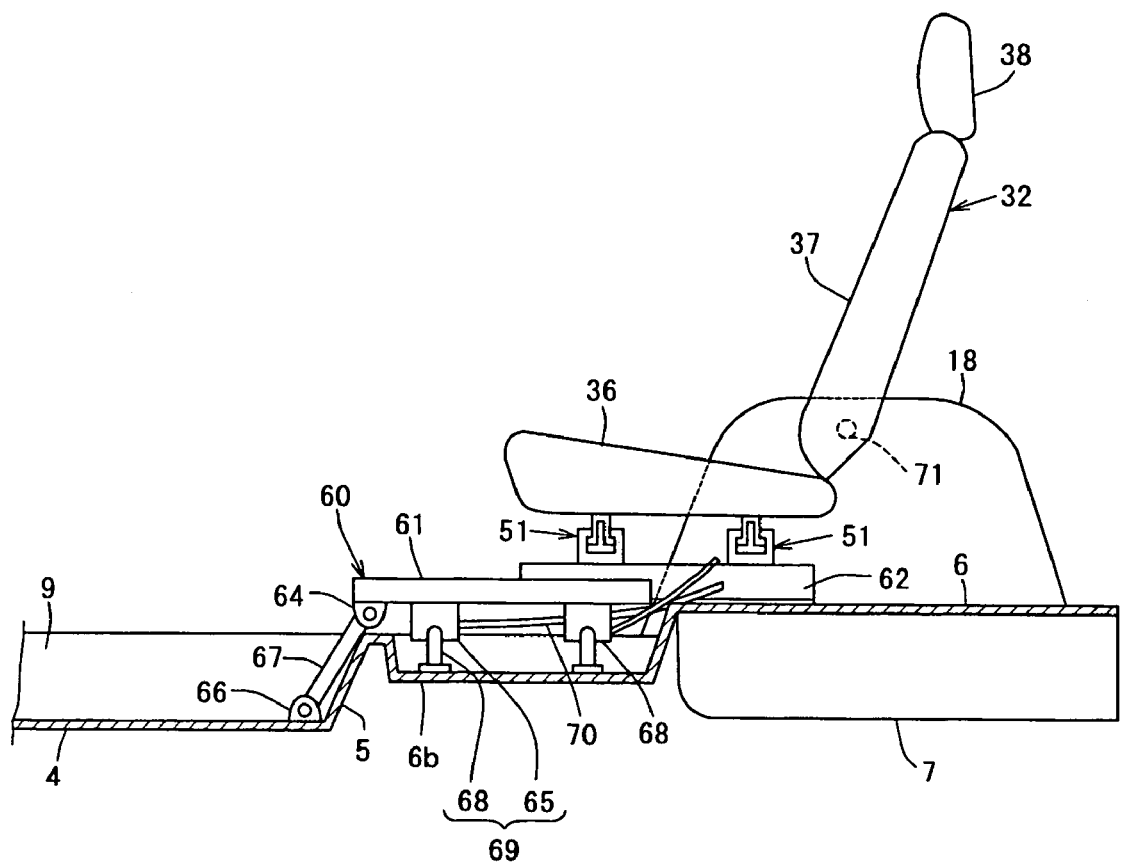
FIG. 21 is a side view of FIG. 20.

The lateral movement of the right seat 32 to the original existing location of the left seat 31, prior to being positioned in the folded state (double-folded state), provides a storage space β which is formed between the right seat 32 and the side wall of the cabin 2, as illustrated in FIG. 18. In order to move the right seat 32 backward to a position between the wheel houses 18, 18, illustrated in FIGS. 19, 20 and 21, from the state illustrated in FIG. 18, the upper rails 62, 62 of the seat slide rails 60, 60 extending longitudinally are moved backward along the lower rails 61, 61. Accordingly, the right seat 32 is moved back along with the seat slide rails 51, 51, and then it is located between the both wheel houses 18, 18 as illustrated in FIGS. 19, 20 and 21. Thus, it can improve comfortable sitting of the rear passenger on the right seat 32.

Figure 22:
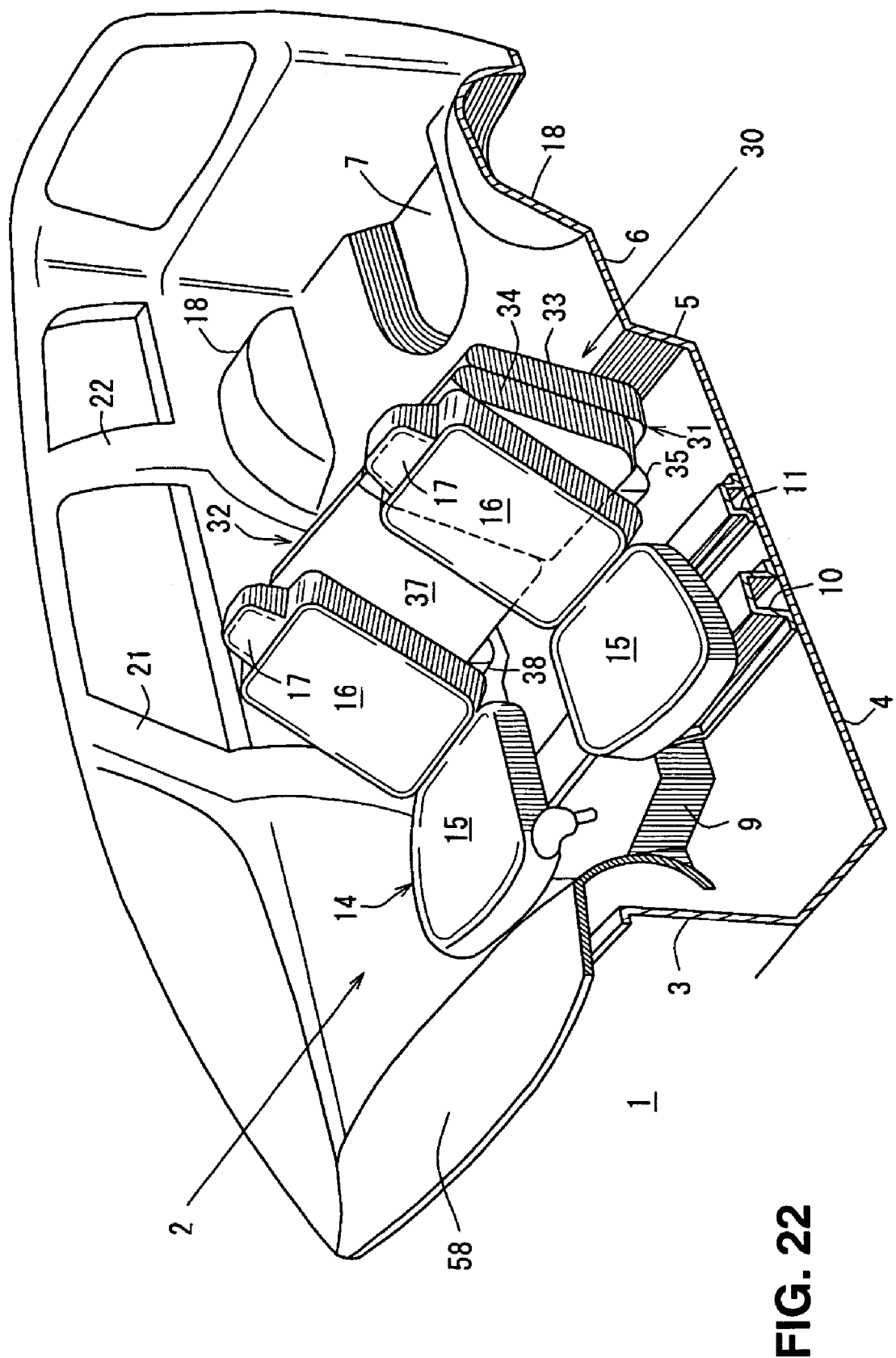
FIG. 22 is a perspective view illustrating both seats in double-fold state.
Figure 23:
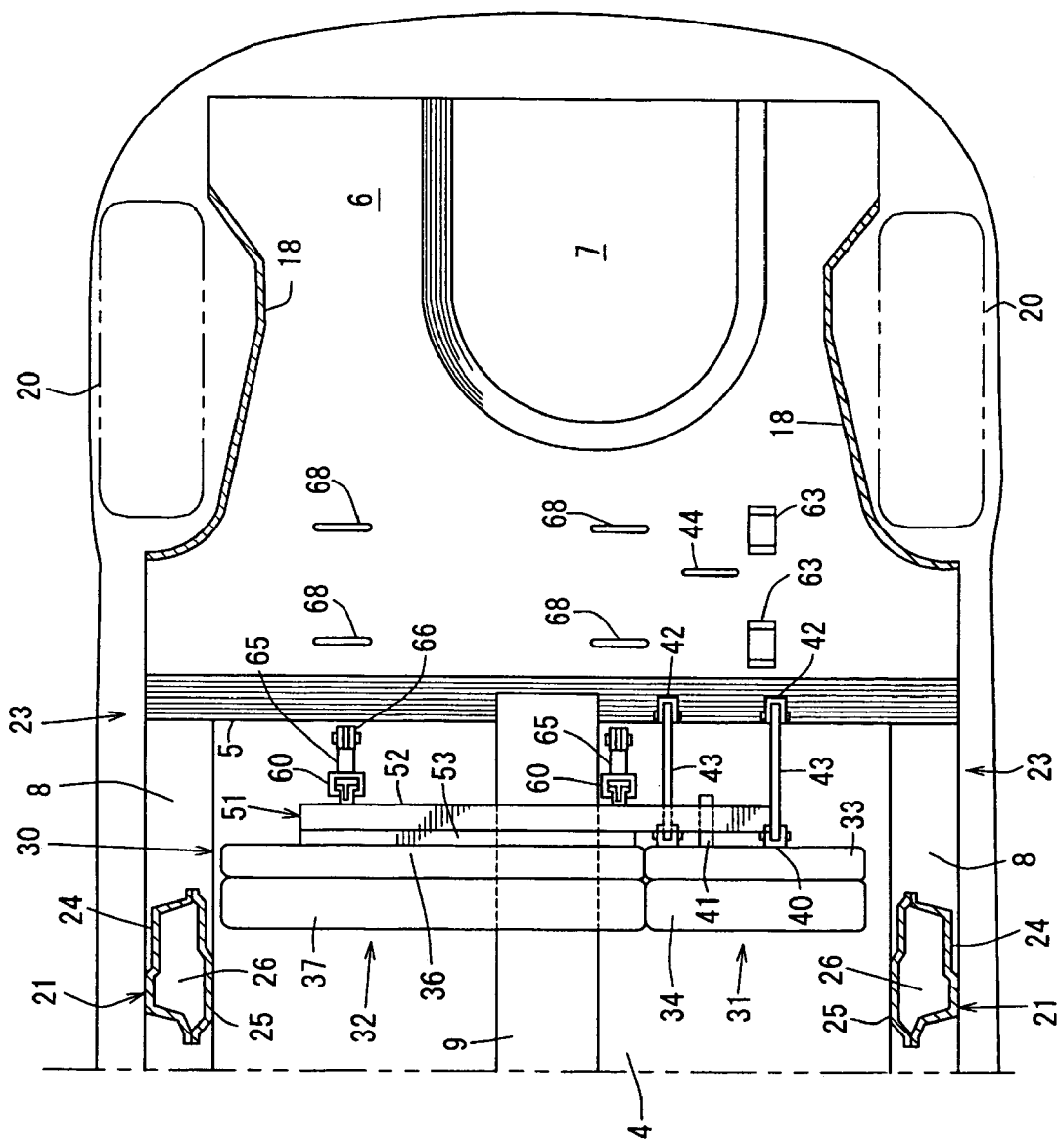
FIG. 23 is an enlarged plan view of a major portion of FIG. 22.
Figure 24:
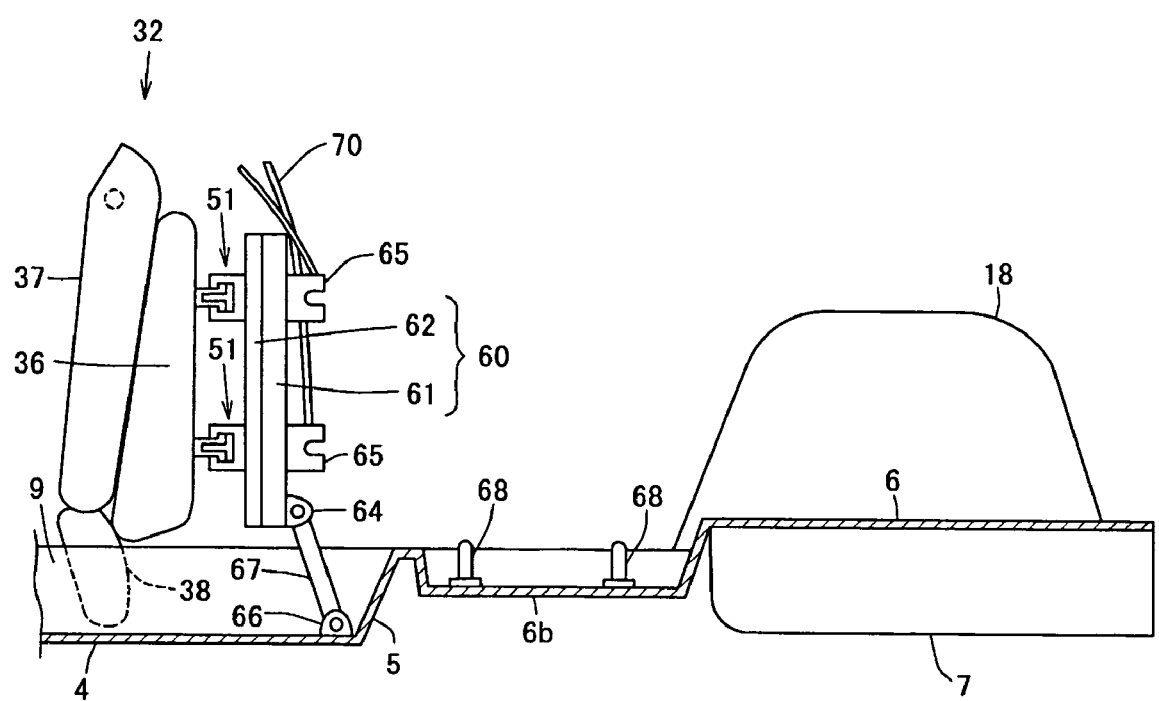
FIG. 24 is a side view of the major portion of FIG. 22.

Meanwhile, when the right seat 32 is also changed to its double-fold state illustrated in FIGS. 22, 23, and 24 from the state where the left seat 31 is in its double-fold state illustrated in FIGS. 16 and 17, the latch 65 is disengaged from the striker 68, first. Then, the seat back 37 is folded on the seat cushion 36. Next, the right seat 32 in the folded state is rotated forward as a whole around the both pivots of the link members 67, 67 so as to be positioned in the upright position. Thus, the right seat 32 can be positioned in its double-fold state, without taking off the headrest 38, as illustrated in FIGS. 22 through 24, in addition to the left seat 31. Accordingly, the cargo space can be expanded properly. Herein, since the both seat slide rails 51, 51 and 60, 60 are rotated forward along with the right seat 32, they are not left on the rear floor 6 after this double-fold-state movement of the right seat 32. Thus, the cargo space can be further expanded and better appearances can be provided.

Namely, these hinge brackets 64, 64 and 66, 66 and link members 67, 67 constitute a second-seat holding mechanism to hold the right seat (the second seat) 32 in its forward-rotated double-fold state. Herein, the second-seat holding mechanism may be, of course, comprised of any members/parts which hold the seat in the double-hold sate instead of the above-described members.

Figure 25:
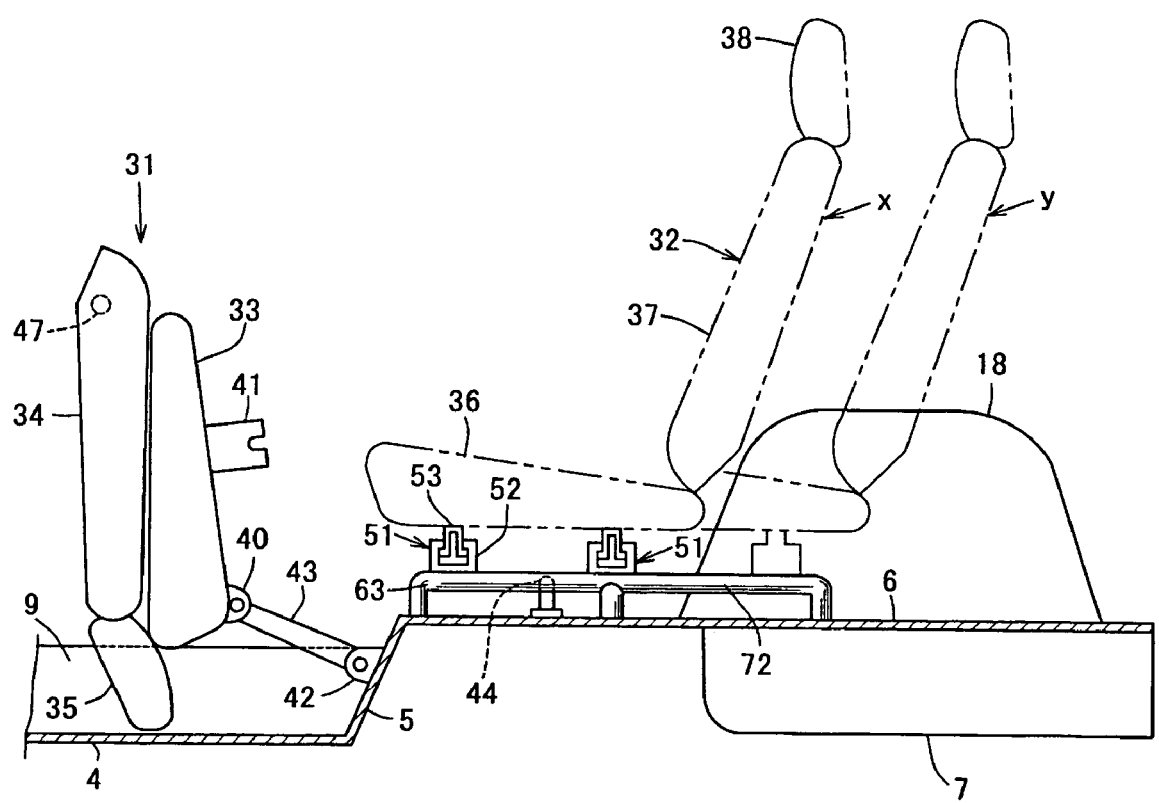
FIG. 25 is a side view illustrating another support structure of a lower portion of a lower-rail extending end.

Herein, a support structure illustrated in FIG. 25 may be applied instead of the support structure illustrated in FIGS. 15 and 17 where the extended end portions of the lower rails 52, 52 of the seat slide rails 51, 51 are supported. In this support structure of FIG. 25, a support rod 72 to support the lower portions of the lower rails 52, 52 is fixed on the rear floor 6 so as to extend, corresponding to the maximum moving distance of the two lower rails 52, 52 which move longitudinally along with the right seat 32. Thus, the lower rails 52, 52 can be supported with the range from the normal position x to the backward position y of the right seat 32 illustrated in FIG. 25.

As described above, according to the present embodiment illustrated in FIGS. 12 though 25, there is provided the seat device for a vehicle, which is disposed on the rear floor panel 6 in the cabin 2 equipped with the ingress and egress opening 23 at the side, comprising the first seat (see the left seat 31) being provided so as to be folded, the second seat (see the right seat 32) being provided beside the first seat, and the second-seat moving mechanism (see the seat slide rails 51, 51) to move the second seat laterally into the space α at the original existing location of the first seat before the first seat has been folded.

According to this structure, since the second seat (see the right seat 32) can be moved laterally into the space α at the original existing location of the first seat (see the left seat 31) before the first seat has been folded, as illustrated in FIG. 10, there can be provided the proper storage space (see the storage space β illustrated in FIG. 18) beside the seat 32 to allow the easy loading and easy access to this storage space from the outside of the vehicle through the ingress and egress opening 23 at the side, thereby improving facilities of the vehicle.

Further, the first seat (see the left seat 31) comprises the seat cushion 33 and the seat back 34, the seat back 34 is configured so as to be folded on the seat cushion 33, and there is provided the first-seat holding mechanism (see the hinge brackets 40, 40 and 42, 42, and the link members 43, 43) to hold the first seat (see the left seat 31) with the seat cushion 33 and the seat back 34 folded on the seat cushion 33 in the double-fold state where both the seat cushion 33 and seat back 34 are positioned in the upright position. According to this structure, since there can be provided the space α (see FIG. 17) where no seat exits by positioning the first seat (see the left seat 31) in its double-fold state, the second seat (see the right seat 32) can obtain the sufficient lateral movement, thereby enlarging the storage space properly.

Herein, the holding mechanism (see the hinge brackets 40, 40 and 42, 42, and the link members 43, 43) holds the first seat (see the left seat 31) in the double-fold state where the seat cushion 33 and seat back 34 folded on the seat cushion 33 have been rotated forward together. According to this structure, the space a for the second seat (see the right seat 32) being moved into can be provided properly just behind the first seat (see the right seat 31).

Additionally, the first seat (see the right seat 31) is configured so as to have the smaller width than the second seat (see the right seat 32). According to this structure, since the first seat 31 having the smaller width is light compared with the second seat 32 having the larger width, it is easy to operate. Also, since the second seat 32 with the larger width is moved laterally for the use, the comfortable sitting of the passenger on it can be improved.

Further, the second seat (see the right seat 32) comprises the seat cushion 36 and the seat back 37, the seat back 37 of the second seat 32 is configured so as to be folded on the seat cushion 36 of the second seat 32, and there is provided the second-seat holding mechanism (see the hinge brackets 64, 64 and 66, 66, and the link members 67, 67) to hold the second seat 32 with the seat cushion 36 and the seat back 37 folded on the seat cushion 36 in the double-fold state where both the seat cushion 36 and seat back 37 of the second seat 32 are positioned in the upright position. According to this structure, since both the seats can be folded as illustrated in FIGS. 22, 23 and 24, the cargo space can be expanded as much as possible.

Further, when the second seat (see the right seat 32) is moved laterally by the second-seat moving mechanism, the storage space β (see FIGS. 10 and 11) is formed between the second seat (see the right seat 32) and the side wall of the cabin 2 as illustrated in FIG. 18. According to this structure, since there can be the storage space β (loading space) between the second seat (see the right seat 32) and the side wall of the cabin 2, the easy loading and easy access from the outside of the vehicle can be attained.

Also, there is provided a pair of wheel houses 18, 18 which project inwardly respectively in the cabin 2, and there is provided the slide mechanism (see the seat slide rails 60, 60) to move the second seat (see the right seat 32) backward to the position between the wheel houses 18, 18. According to this structure, since the second seat (the right seat 32) can be moved backward to the position between wheel houses 18, 18, the comfortable sitting of the passenger on the right seat 32 can be improved.

The floor panel on which the seat of the present invention is disposed corresponds to the rear floor 6 of the embodiments described above. Likewise, the first seat corresponds to the left seat 31, and the second seat corresponds to the right seat 32. The present invention should not be limited to the above-described embodiments, but any other modifications and improvements may be applied within the scope of a sprit of the present invention.

Although the seat device according to the present invention is applied to the rear seat 30 which is the second-row seat located behind the front seat 14 in the above-described embodiments, it may be applied to the rearmost-row seat located near the wheel houses for a vehicle in which there are provided three-row seats or four-row seats.

What is claimed is:

1. A seat device for a vehicle, which is disposed on a floor panel in a cabin equipped with an ingress and egress opening at a side, comprising;
   a front seat, the front seat comprising a seat cushion and a seat back;
   a rear seat, the rear seat being disposed behind said front seat and comprising a first seat and a second seat that are disposed side by side in a vehicle width direction,
   the first seat comprising a seat cushion and a seat back, the seat back of the first seat being configured so as to be folded on the seat cushion of the first seat, and pivotally attached to the floor panel by;
   a first-seat holding mechanism operative to hold said first seat with said seat cushion and said seat back folded on said seat cushion in a double-fold state where said seat cushion and seat back folded on the seat cushion are rotated forward together and positioned in an upright position substantially forwardly of the floor panel attachment of the first seat;
   the second seat comprising a seat cushion and a seat back;
   a second-seat moving mechanism to move said second seat laterally into a space at an original existing location of said first seat that is created behind said first seat taking said double-fold state, the second seat laterally moved by the second-seat moving mechanism forming a storage space between the second seat and a side wall of the cabin,
   wherein said second seat moved laterally by said second-seat moving mechanism can take a use position where a passenger can be seated thereon behind said first seat taking the double-fold state.

2. The seat device for a vehicle of claim 1, wherein said first seat is configured so as to have a smaller width than said second seat.

3. The seat device for a vehicle of claim 2, wherein said seat back of the second seat is configured so as to be folded on said seat cushion of the second seat, and there is provided a second-seat holding mechanism to hold said second seat with said seat cushion and said seat back folded on said seat cushion in a double-fold state where both said seat cushion and seat back of the second seat are rotated forward together and positioned in an upright position.

4. The seat device for a vehicle of claim 1, wherein there is provided a slide mechanism to move said second seat backward to a position between wheel houses which project inwardly respectively in the cabin.

5. The seat device for a vehicle of claim 1, wherein said second-seat moving mechanism is configured to move said second seat laterally in such a manner that only a portion of the second seat is located in said space at the original existing location of said first seat.

6. The seat device for a vehicle of claim 2, wherein said front seat comprises a driver's seat and a passenger's seat, and a child seat is attachable to said second seat of to rear seat such that when the second seat is laterally moved by said second-seat moving mechanism, the attached child seat to the second seat is located in back of a center portion between the driver's seat and the passenger's seat.

7. The seat device for a vehicle of claim 3, wherein said second-seat moving mechanism is rotated forward along with said second seat of the rear seat when the second seat is held in the double-fold state by said second-seat holding mechanism.

8. The seat device for a vehicle of claim 1, wherein said first-seat holding mechanism comprises a two-hinged link.

* * * * *